(12) United States Patent
Kozlowski, III

(10) Patent No.: US 11,562,451 B1
(45) Date of Patent: Jan. 24, 2023

(54) APPARATUS FOR PROPORTIONAL CALCULATION REGARDING NON-FUNGIBLE TOKENS

(71) Applicant: Glimpse Enterprises Incorporated, New York, NY (US)

(72) Inventor: Theodore Kozlowski, III, Greenville, SC (US)

(73) Assignee: Glimpse Enterprises Incorporated, New York, NY (US)

( * ) Notice: Subject to any disclaimer, the term of this patent is extended or adjusted under 35 U.S.C. 154(b) by 0 days.

(21) Appl. No.: 17/586,256

(22) Filed: Jan. 27, 2022

Related U.S. Application Data

(60) Provisional application No. 63/296,933, filed on Jan. 6, 2022, provisional application No. 63/257,110, filed on Oct. 18, 2021.

(51) Int. Cl.
*G06Q 50/18* (2012.01)
*G06F 16/27* (2019.01)

(52) U.S. Cl.
CPC .......... *G06Q 50/184* (2013.01); *G06F 16/27* (2019.01)

(58) Field of Classification Search
None
See application file for complete search history.

(56) References Cited

U.S. PATENT DOCUMENTS 9,904,773 B1 2/2018 Stavros
11,182,757 B2 11/2021 Xu et al.
2019/0318348 A1 10/2019 Brenner et al.
2021/0133713 A1* 5/2021 Wang ................. G06Q 20/0655
2021/0358038 A1* 11/2021 Vandenberg .......... G06Q 40/04

FOREIGN PATENT DOCUMENTS

WO 2019213700 11/2019
WO WO-2019213700 A1 * 11/2019

OTHER PUBLICATIONS

Alyssa Travis, "What's the Value of an NFT: A Look into Traditional Art Market Principles," May 19, 2021, available online at https://the-crypto-curator.medium.com/whats-the-value-of-an-nft-a-look-into-traditional-art-market-principles-cc835535c359 (Year: 2021).*
Lydia Mendola, Maria Cristina Michelini, Marianna Riedo, Francesco Tognato, How AI And Blockchain Are Changing the Art (And Legal) World, Jul. 29, 2021.
David Hoppe, Essential Considerations in NFT Licensing Agreements, Jun. 8, 2021.

* cited by examiner

*Primary Examiner* — Jan P Mincarelli
(74) *Attorney, Agent, or Firm* — Caldwell Intellectual Property Law

(57) ABSTRACT

An apparatus for proportional calculation regarding non-fungible tokens is presented. The apparatus includes at least a processor and a memory. The memory is communicatively connected to the at least a processor, wherein the memory contains instructions configuring the at least a processor to receive a plurality of non-fungible tokens, the plurality of non-fungible tokens include a primary non-fungible token representing a primary creative work and a secondary non-fungible token representing a secondary work, wherein the secondary work includes at least a portion of the primary creative work, calculate a contribution metric of primary creative work to the secondary creative work and post a digitally signed assertion to an immutable sequential listing as a function of the contribution metrics.

18 Claims, 8 Drawing Sheets

APPARATUS FOR PROPORTIONAL CALCULATION REGARDING NON-FUNGIBLE TOKENS

CROSS-REFERENCE TO RELATED APPLICATIONS

This application claims the benefit of Provisional Application No. 63/296,933, filed on Jan. 6, 2022 and entitled "SYSTEMS AND METHODS OF GENERATING REVENUE BACKED NON-FUNGIBLE TOKENS AND OTHER INVESTMENT VEHICLES," the entirety of which is incorporated herein by reference. This application claims the benefit of Provisional Application No. 63/257,110, filed on Oct. 18, 2021 and entitled "SYSTEMS AND METHODS OF GENERATING REVENUE BACKED NON-FUNGIBLE TOKENS AND OTHER INVESTMENT METHODS," the entirety of which is incorporated herein by reference.

FIELD OF THE INVENTION

The present invention generally relates to the field of non-fungible tokens. In particular, the present invention is directed to an apparatus for proportional calculation regarding non-fungible tokens.

BACKGROUND

Non-fungible tokens (NFTs) are currently taking the digital art and collectibles world by storm. However, NFTs pose complex challenges for tracking and establishing inter-relations between NFTs and their underlying works.

SUMMARY OF THE DISCLOSURE

In an aspect, an apparatus for proportional calculation regarding non-fungible tokens is presented. The apparatus includes at least a processor and a memory. The memory is communicatively connected to the at least a processor, wherein the memory contains instructions configuring the at least a processor to receive a plurality of non-fungible tokens, the plurality of non-fungible tokens include a primary non-fungible token representing a primary creative work and a secondary non-fungible token representing a secondary work, wherein the secondary work includes at least a portion of the primary creative work, calculate a contribution metric of primary creative work to the secondary creative work and post a digitally signed assertion to an immutable sequential listing as a function of the contribution metric.

In another aspect, a method for proportional calculation regarding non-fungible tokens is presented. The method includes receiving, by at least a processor communicatively connected to at least a memory, a plurality of non-fungible tokens, the plurality of non-fungible tokens a primary non-fungible token representing a primary creative work and a secondary non-fungible token representing a secondary work, wherein the secondary work includes at least a portion of the primary creative work, calculating a contribution metric of the primary creative work to the secondary creative work, and deploying a digitally signed assertion to an immutable sequential listing as a function of the contribution metric.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
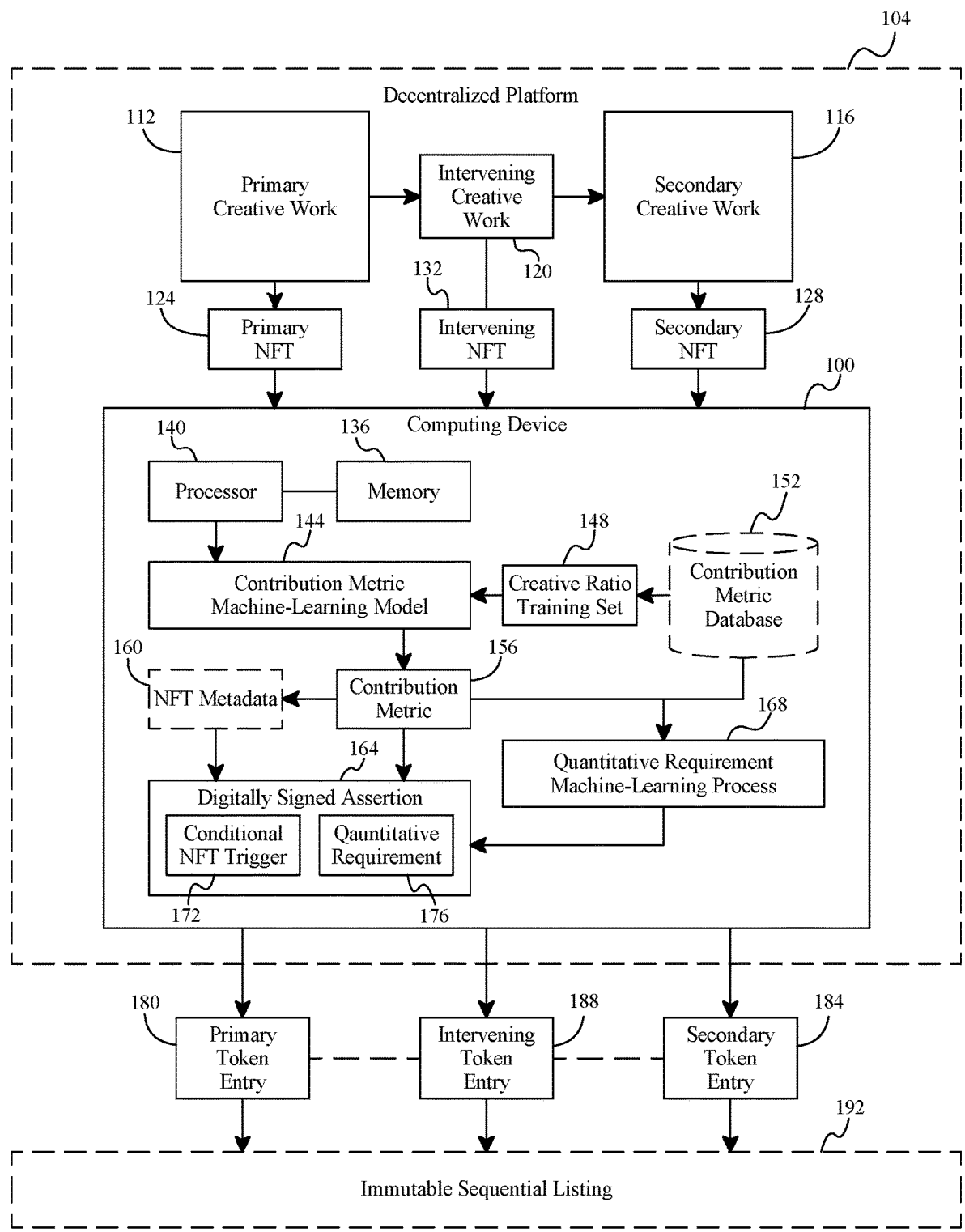
FIG. 1 is a block diagram of an exemplary embodiment of an apparatus for proportional calculation regarding non-fungible tokens.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus for revenue sharing of non-fungible tokens. A "non-fungible token" (NFT), as defined, is a cryptographic asset on a blockchain with unique identification codes and metadata that distinguishes it from other NFTs. NFTs may include tokens t may be used to represent ownership of unique items such as art, collectibles, even real estate. NFTs give the ability to assign or claim ownership of any unique piece of digital data, trackable by using a decentralized platform as a ledger. Ownership of an NFT is managed through unique metadata and identification that prevents no other token from replicating it; NFT may have a single owner at a time and/or multiple owners of fractional or partial interests in the NFT, which may be conveyed and/or transferred to new owners in bundled or independent transactions. NFTs and the ledger that it is tracked on open a new avenue for income and digital exchange. A piece of art may be used to influence and derive another piece of art, divide into smaller pieces of that same art, and maintain public accessibility. NFTs and digitalized art can be used the same. Just as a physical piece of art can be used as a vehicle for monetary purposes, a tokenized art piece also be a vehicle for similar purposes. In an embodiment, an NFT may include an asset representing any form of physical or virtual art, such as a video, image, audio file, textual data, and the like thereof. In another embodiments, an NFT can include ownership of any physical or virtual asset such as tangible commodities, real-estate, collectables, and the like thereof. Aspects of the present disclosure can include decentralized platform that allows artists or creators to tokenize their assets into a NFTs to be added into a blockchain. The decentralized platform can also allow for artists to monetize their assets by monetary transactions of their NFTs. Aspects of the present disclosure can be used to price and determine the value of the NFTs on the blockchain. In an embodiment, a computing device can generate smart contracts that include royalty payment requirements to be sent to the artist of the asset identified by its respective NFT. In another embodiment, the computing device can allow artists to price their own assets.

Aspects of the present disclosure can be used to valuate new assets that were created from some portion of a previously minted asset in the blockchain. For example, an artist creates an NFT for an audio file which is added into the blockchain. The artist then allows another artist to use some portion of that audio file, such as an audio sample or audio snippet, to create another audio file which can also be minted into an NFT to be added onto the blockchain. The artist of the original audio file can receive monetary compensation in the form of royalties or upstream payment based on how much of the original audio file is used to create the second audio file. Aspects of the present disclosure can add the second audio file into the blockchain and secure it with cryptographic hash of the original audio file, timestamp, and/or transaction data to track a fractional ownership of the original audio file and automate the upstream payment to the art is of the original audio file.

Aspects of the present disclosure can be used to link a stream of assets wherein each asset is created using some portion of its prior asset, ultimately resulting in a downstream of assets. In an embodiment, each of these assets, identified by their own individual NFTs cryptographically hashed to its previous NFT can be traded for monetary purposes. In an embodiment, an artist can sell its asset to a buyer by selling the NFT representing that asset. In another embodiment, an artist can lend its asset to a borrower in which the computing device can generate a smart contract based on the length of the loan of the asset. In another embodiment, even the borrower can lend that asset to another borrower, creating a chain of borrowers in which the asset and NFT are linked to. Aspects of the present disclosure can be used to track and manage the upstream payment and fulfillment of the smart contracts associated with these transactions. These NFTs can include revenue-backed non-fungible token (rbNFT).

Aspects of the present disclosure can also be used to mint NFTs. In an embodiment, the computing device can receive NFTs owned by an artist to add into the blockchain. In another embodiment, the apparatus may include a third party of miner and/or enable a third party of miners to mint the asset into an NFT for which the computing device may generate a block for that NFT to be confirmed and "immortalized" on the blockchain.

Referring now to FIG. 1, an exemplary embodiment of an apparatus 100 for revenue sharing of non-fungible tokens (NFTs) is illustrated. Apparatus 100 includes a computing device. The computing device may include any computing device as described in this disclosure, including without limitation a microcontroller, microprocessor, digital signal processor (DSP) and/or system on a chip (SoC) as described in this disclosure. The computing device may include, be included in, and/or communicate with a mobile device such as a mobile telephone or smartphone. computing device 108 may include a single computing device operating independently, or may include two or more computing device operating in concert, in parallel, sequentially or the like; two or more computing devices may be included together in a single computing device or in two or more computing devices. The computing device may interface or communicate with one or more additional devices as described below in further detail via a network interface device. Network interface device may be utilized for connecting the computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. The computing device may include but is not limited to, for example, a computing device or cluster of computing devices in a first location and a second computing device or cluster of computing devices in a second location. The computing device may include one or more computing devices dedicated to data storage, security, distribution of traffic for load balancing, and the like. The computing device may distribute one or more computing tasks as described below across a plurality of computing devices of computing device, which may operate in parallel, in series, redundantly, or in any other manner used for distribution of tasks or memory between computing devices. The computing device may be implemented using a "shared nothing" architecture in which data is cached at the worker, in an embodiment, this may enable scalability of apparatus 100 and/or a computing device.

With continued reference to FIG. 1, a computing device may be designed and/or configured to perform any method, method step, or sequence of method steps in any embodiment described in this disclosure, in any order and with any degree of repetition. For instance, the computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. computing device 108 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, apparatus 100 may include a decentralized platform 104 for which a computing device and/or apparatus 100 may operate on. A "decentralized platform," as used in this disclosure, is a platform or server that enables secure data exchange between anonymous parties. Decentralized platform 104 may be supported by any blockchain technologies. For example and without limitation, blockchain-supported technologies can potentially facilitate decentralized coordination and alignment of human incentives on a scale that only top-down, command-and-control structures previously could. "Decentralization," as used in this disclosure, is the process of dispersing functions and power away from a central location or authority. In a non-limiting embodiment, decentralized platform 104 can make it is difficult if not impossible to discern a particular center. In some embodiments, decentralized platform 104 can include a decentralized ecosystem. Decentralized platform 104 may serve as an ecosystem for decentralized architectures such as an immutable sequential listing and/or blockchain. Decentralized platform and/or other platforms and/or devices as described in this disclosure may perform any methods and/or method steps, and/or may include any configurations, data, and/or components, described in U.S. Provisional App. Ser. Nos. 63/296,933 and/or 63/257,110.

In a non-limiting embodiment, and still referring to FIG. 1, decentralized platform 104 may implement decentralized finance (DeFi). "Decentralized finance," as used in this disclosure, as financial technology based on secure distributed ledgers similar. A decentralized finance architecture may include cryptocurrencies, software, and hardware that enables the development of applications. Defi offers financial instruments without relying on intermediaries such as brokerages, exchanges, or banks. Instead, it uses smart contracts on a blockchain. DeFi platforms allow people to lend or borrow funds from others, speculate on price movements on assets using derivatives, trade cryptocurrencies, insure against risks, and earn interest in savings-like accounts. In some embodiments, DeFi uses a layered architecture and highly composable building blocks. In some embodiments DeFi platforms may allow creators and/or owners to lend or borrow funds from others, trade cryptocurrencies and/or NFTs, insure against risks, and receive payments. In a non-limiting embodiment, Defi may eliminate intermediaries by allowing creators to conduct financial transactions through peer-to-peer financial networks that use security protocols, connectivity, software, and hardware advancements. Persons skilled in the art, upon reviewing the entirety of this disclosure, will be aware of the various embodiments of implementing decentralized finance for purposes as described herein.

Figure 5:
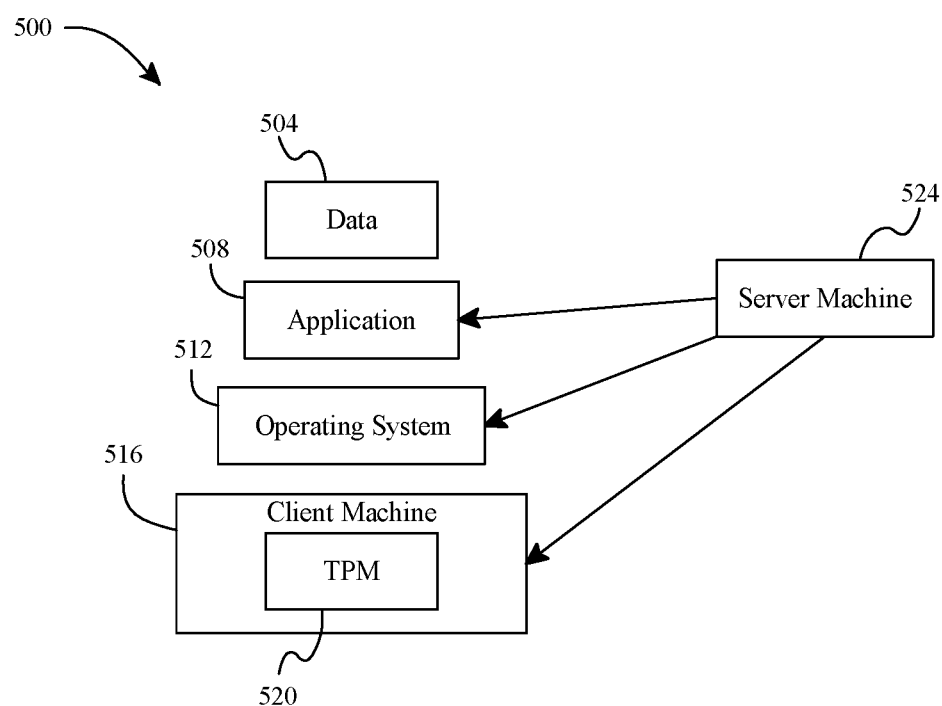
FIG. 5 is a block diagram of an exemplary embodiment of a trusted computing architecture.

In a non-limiting embodiment, and still referring to FIG. 1, decentralized platform 104 may implement Web 3.0. Whereas Web 2.0 is a two-sided client-server architecture, with a business hosting an application and users (customers and advertisers), "Web 3.0," as used in this disclosure, is an idea or concept that decentralizes the architecture on open platforms. In some embodiments, decentralized platform 104 may enable communication between a plurality of computing devices, wherein it is built on a back-end of peer-to-peer, decentralized network of nodes (computing devices), the applications run on decentralized storage systems rather than centralized servers. In some embodiments, these nodes of computing devices may be comprised together to form a World Computer. A "World Computer," as used in this disclosure, is a group of computing devices that are capable of automatically executing smart contract programs on a decentralized network. A "decentralized network," as used in this disclosure, is a set of computing device sharing resources in which the architecture of the decentralized network distributes workloads among the computing devices instead of relying on a single central server. In a non-limiting embodiment, a decentralized network may include an open, peer-to-peer, Turing-complete, and/or global system. A World Computer and/or apparatus 100 may be communicatively connected to immutable sequential listing 192. Any digitally signed assertions onto immutable sequential listing 192 may be configured to be confirmed by the World Computer. Alternatively or additionally, apparatus 100 may be configured to store a copy of immutable sequential listing 192 into memory 136. This is so, at least in part, to process a digitally signed assertion that has a better chance of being confirmed by the World Computer prior to actual confirmation. In a non-limiting embodiment, decentralized platform 104 may be configured to tolerate localized shutdowns or attacks; it is censorship-resistant. In another non-limiting embodiment decentralized platform 104 and/or apparatus 100 may incorporate trusted computing as shown in FIG. 5. In a non-limiting example, because there is no one from whom permission is required to join the peer-to-peer network, as long as one operates according to the protocol; it is open-source, so its maintenance and integrity are shared across a network of engineers; and it is distributed, so there is no central server nor administrator from whom a large amount of value or information might be stolen. Persons skilled in the art, upon reviewing the entirety of this disclosure, will be aware of the various embodiments and functions of a decentralized platform for purposes as described herein.

With continued reference to FIG. 1, decentralized platform 104 may include a decentralized exchange platform. A "decentralized exchange platform," as is used in this disclosure, contains digital technology, which allows buyers and sellers of securities such as NFTs to deal directly with each other instead of meeting in a traditional exchange. In some embodiments, decentralized platform 104 may include an NFT marketplace. An "NFT marketplace" is a marketplace allowing uses to trade NFTs and upload them to an address. Decentralized platform 104 may act as any NFT marketplace such as, but not limited to, OpenSea, Polygon, FCTONE, The Sandbox, CryptoKitties, Dentraland, Nifty Gateway, VEEFreinds, ROCKI, SuperRare, Enjin Marketplace, Rarible, WazirX, Portion, Zora, Mintable, PlayDapp, Aavegotchi, and the like thereof. Persons skilled in the art, upon reviewing the entirety of this disclosure, will be aware of the various embodiments of a marketplace in the context of NFTs.

With continued reference to FIG. 1, a computing device and/or apparatus 100 may include a memory 136 and at least a processor 140. Memory 136 may include any memory as described in this disclosure. Memory 136 may be communicatively connected to processor 140. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure. Memory 136 may be configured to provide instructions to processor 140, which may include any processor as described in this disclosure.

With continued reference to FIG. 1, processor 140 may be configured to receive a plurality of non-fungible tokens (NFTs). A "non-fungible token," as used in this disclosure, is a unique and non-interchangeable unit of data stored on a digital ledger and/or immutable sequential listing, including without limitation a digital ledger and/or immutable sequential listing as described in this disclosure. NFTs may be associated with reproducible digital files such as photos, videos, and audio. NFTs may also be associated with physical assets such as real estate, collectables, and other commodities. In a non-limiting embodiment, a creator may create a virtual asset such as a digital artwork, animation video, game, or the like. The creator may also create a physical asset such as a painting, live-action video, toys, or the like. The creator may "tokenize" such assets to be stored on a digital ledger and/or immutable sequential listing, which may ensure non-duplicability and ownership, generate income, and/or enable accessibility of the assets. Persons skilled in the art, upon reviewing the entirety of this disclosure, will be aware of the various embodiments and purposes of tokenizing an asset.

With continued reference to FIG. 1, a creator may submit and/or trade their creative works in decentralized platform 104. A "creator," as used in this disclosure, is an entity that creates an asset including a physical and/or virtual work of art to be tokenized. As used in this disclosure, "tokenization" is the process of substituting a sensitive data element with a non-sensitive equivalent, referred to as a token, that has no extrinsic or exploitable meaning or value. In a non-limiting embodiment, a creator can create an asset including an audio file, painting, drawing, digital file, photos, real-estate, and the like thereof. An asset can include virtually and/or physically any commodity that can be traded, sold, bought, owned, or combination thereof. In a non-limiting embodiment, a creator may tokenize their asset into a cryptographic asset. A "cryptographic asset," as used in this disclosure, is a transferable digital representation designed in a way that prohibits its copying or duplication. In a non-limiting embodiment, apparatus 100 may include components to facilitate the transfer of cryptographic assets via some distributed ledger technology including an immutable sequential listing 192.

With continued reference to FIG. 1, a creator may create any creative work and/or asset and tokenize it into an NFT. In a non-limiting embodiment, a primary creator may create a primary creative work 112. A "primary creative work," as used in this disclosure, is any asset and/or work of art originating from a creator. In some embodiments, the creator may tokenize primary creative work 112 into a non-fungible token (NFT). In some embodiments, apparatus 100 may be configured to enable a creator to tokenize their creative work and/or asset by generating the NFT and/or initiating generation thereof at apparatus; generation may be performed entirely on apparatus and/or by apparatus in combination with and/or in conjunction with other devices in a network. In some cases, a creator may tokenize their creative work and/or asset in a different decentralized platform. Apparatus 100 may be configured to receive NFTs tokenized in different platforms. In a non-limiting embodiment, apparatus may be configured to mint an NFT into some sequential listing such as immutable sequential listing 192. "Mint" or "minting," as used in this disclosure, is the process of confirming a cryptographic asset and deploying it on some sequential listing, blockchain, or the like thereof. In a non-limiting embodiment, processor 140 may mint an NFT into a token entry to be deployed onto a blockchain such as immutable sequential listing 192 via a smart contract such as a digitally signed assertion 164. Persons skilled in the art, upon reviewing the entirety of this disclosure, will be aware of the various embodiments of the process of transforming an asset into a cryptographic asset for purposes as described herein.

With continued reference to FIG. 1, apparatus 100 may include a digital port enabling a creator to connect a digital wallet to an NFT-supported system such as decentralized platform 104, processor 140, and/or immutable sequential listing 192. A "digital wallet," as used in this disclosure, is a software-based system that securely stores creators' payment information and passwords for numerous payment methods and websites. By using a digital wallet, creators can complete purchases easily and quickly with near-field communications technology. In a non-limiting embodiment, decentralized platform 104 may include a web interface enabling a creator to create an NFT associated with primary creative work 112 and upload a digital file representing ownership of primary creative work 112 to decentralized platform 104. In some embodiments, apparatus 100 may include a third party and/or enable a third party called "miners" to perform the minting process of an asset into an NFT. Persons skilled in the art, upon reviewing the entirety of this disclosure, will be aware of the various embodiments of minting and mining an NFT in the context of securely transforming assets into cryptographic assets.

With continued reference to FIG. 1, apparatus 100 may enable the use of cryptocurrency. "Cryptocurrency," as used in this disclosure, is a digital or virtual currency that is secured by cryptography, which makes it nearly impossible to counterfeit or double-spend. In some embodiments, cryptocurrencies are decentralized networks based on blockchain technology such as immutable sequential listing 192 enforced by a network of computing devices including apparatus 100. In some embodiments, apparatus 100 may accept fiat money such as paper money. In some embodiments, apparatus 100 may allow various types of cryptocurrency such as Ethereum (ETH), Litecoin (LTC), Cardano (ADA), Polkadot (DOT), Bitcoin Cash (BCH), Stellar (XLM), and the like thereof. Persons skilled in the art, upon reviewing the entirety of this disclosure, will be aware of the various embodiments of different types of money for purposes as described herein.

With continued reference to FIG. 1, processor 140 may be configured to receive a plurality of NFTs. NFTs have special properties wherein each NFT has a unique identifier that is linked to one address of some decentralized platform and/or blockchain. Each NFT is associated with an owner whose information is easily verifiable. An NFT is associated with a proof-of-ownership which can be transferred to a digital wallet. In a non-limiting embodiment, NFTs may be sold, bought, and/or traded in which the proof-of-ownership follows. In some embodiments, apparatus 100 may implement proof-of-ownership of an NFT associated with a creator's primary creative work 112.

In a non-limiting embodiment, and still referring to FIG. 1, a proof-of-ownership can include a secure. A "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other party to the proof, for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof Zero-knowledge proof may include, without limitation bulletproofs. Zero-knowledge proof may include a homomorphic public-key cryptography (hPKC)-based proof Zero-knowledge proof may include a discrete logarithmic problem (DLP) proof. Zero-knowledge proof may include a secure multi-party computation (MPC) proof Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system, or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

In a non-limiting embodiment, and still referring to FIG. 1, proof-of-ownership of an NFT can be implemented using as a digital signature. A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

In an embodiment, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature. In a non-limiting embodiment, apparatus 100 may include a third party and/or enable a third party such as a certificate authority (CA) to verify that the possessor of the private key is a particular entity such as an NFT; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature. Persons skilled in the art, upon reviewing the entirety of this disclosure, will be aware of the various embodiments of proving ownership of a digital asset in the context of NFTs.

With continued reference to FIG. 1, an NFT may include a reference that maps back to the sensitive data through processor 140. In some embodiments, apparatus 100 may include a tokenization system. A "tokenization system," as used in this disclosure, is a software and/or hardware module used to link the original data to a token but does not provide any way to decipher the token and reveal the original data. In a non-limiting embodiment, a tokenization system may be logically isolated and segmented from data processing systems and applications that previously processed or stored sensitive data replaced by tokens. Only the tokenization system can tokenize data to create tokens, or detokenize back to redeem sensitive data under strict security controls.

With continued reference to FIG. 1, the plurality of NFTs may include at least a primary NFT 124 and at least a secondary NFT 128. A "primary NFT," as used in this disclosure, is an NFT and/or cryptographic asset of primary creative work 112. In a non-limiting embodiment, primary NFT 124 may be minted and/or created by a primary creator. In another embodiment, primary NFT 124 may be minted and/or created by apparatus 100. For example and without limitation, apparatus 100 may enable a creator to mint their creative work into an NFT to be deployed onto a blockchain and/or immutable sequential listing 192. Apparatus 100 may incorporate a web interface instructing creators how to create and mint their assets into an NFT. In another non-limiting embodiment, apparatus 100 may receive any NFT from a creator wherein the NFT is minted somewhere else, either by the creator themselves and/or another decentralized exchange platform. Primary NFT 124 may include an original creative work, wherein the original creative work was created without explicitly using components of previous creative work. For example and without limitation, primary creative work 112 tokenized as primary NFT 124 may include an original digital artwork made from scratch. In another non-limiting example, primary creative work 112 tokenized as primary NFT 124 may include an original audio file of an original song. Alternatively or additionally, primary NFT 124 may include any cryptographic asset of a creative work used to create, by another creator, a new creative work. A "secondary NFT," as used in this disclosure, is any NFT tokenizing a secondary creative work 116. A "secondary creative work," as used in this disclosure, is any creative work created by a creator in which the secondary creative work contains at least a portion of primary creative work 112. In a non-limiting embodiment, the at least a portion of primary creative work 112 may include intervening creative work 120. An "intervening creative work," as used in this disclosure, is a third creative work including at least of portion of primary creative work 112 and having at least a portion included and/or used in the creation of secondary creative work 116. In some embodiments, intervening creative work 120 may include a portion of creative work in which primary creative work 112 and secondary creative work 116 have in common. For example and without limitation, primary creative work may include a painting of an animal. A second creator may create secondary creative work 116 wherein the second creator uses intervening creative work 120 such as the portion of the painting containing the animal. For example secondary creative work 112 may include a painting of a zoo with intervening creative work 120 (e.g. an animal) of primary creative work 112 is incorporated. In another non-limiting example, a second creator may create a video in which the second creator incorporates intervening creative work 120 into the video. Intervening creative work 120 that is being used in the creation of a secondary creative work may not be limited to the same medium of work. In some embodiments, the second creator may incorporate at least a portion of a primary creator's creative work with the primary creator's permission. In another non-limiting example, primary creative work 112 may include a video recording of a person. Further continuing the example, intervening creative work 120 may include just the audio of the video recording from primary creative work 112; secondary creative work 116 may be created in which the secondary creator uses the audio of primary creative work, or a sample of video from intervening creative work that includes such audio, in a new video. Persons skilled in the art, upon reviewing the entirety of this disclosure, will be aware of the various embodiments of creative works for purposes as described herein.

In a non-limiting embodiment, and still referring to FIG. 1, intervening creative work 120 may be considered as a creative work created by a primary creator and/or the same creator of primary creative work 112. In some embodiments, the primary creator may tokenize intervening creative work 120 into intervening NFT 132. An "intervening NFT," as used in this disclosure, is an NFT representing an intervening creative work. In a non-limiting embodiment, primary creative work 112 may include a plurality of intervening creative works, wherein each the creator tokenizes each intervening creative work. For example and without limitation, a creator seeking to maximize profit may not only tokenize a primary creative work, but also create sub-creative works out of the primary creative work to tokenize into NFTs. This is so, at least in part, for the creator to generate income not only from the primary creative work, but also the sub-creative works. The creator may sell each sub-creative work to other creators who intends to use it for their separate creative works. Each sub-creative work of the primary creator used by a secondary creator may be denoted as an intervening creative work. Persons skilled in the art, upon reviewing the entirety of this disclosure, will be aware of the various embodiments of dividing an asset into smaller portions for purposes as described herein.

With continued reference to FIG. 1, processor 140 may add each NFT into an immutable sequential listing 192. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. The immutable sequential listing as used in this disclosure is further described in FIG. 3. In a non-limiting embodiment, immutable sequential listing 192 may include a blockchain. A "blockchain," as used in this disclosure is a growing list of records, called blocks, which are linked together using cryptography. Each block contains a cryptographic hash of the previous block, a timestamp, and transaction data (generally represented as a Merkle tree). The timestamp proves that the transaction data existed when the block was published in order to get into its hash. As blocks each contain information about the block previous to it, they form a chain, with each additional block reinforcing the ones before it. Therefore, the blockchain is resistant to modification of their data because once recorded, the data in any given block cannot be altered retroactively without altering all subsequent blocks. In some embodiments, the blockchain may be managed by decentralized platform 104 and/or a World Computer such as a peer-to-peer network for use as a publicly distributed ledger, where nodes collectively adhere to a protocol to communicate and validate new blocks. Although blockchain records are not unalterable as forks are possible, blockchains may be considered secure by design and exemplify a distributed computing system with high Byzantine fault tolerance.

In a non-limiting embodiment, and still referring to FIG. 1, immutable sequential listing 192 may include an address. A "address," as used in this disclosure, is a unique sequence of numbers and letters which may serve as a bank account for cryptographic assets and/or a pseudonymous identifier for a person, entity, and/or device participating in transactions and/or exchanges performed on immutable sequential listings and/or as described in this disclosure. In a non-limiting embodiment, an address may include a unique identifier that serves as a virtual location where the cryptocurrency can be sent. An address may include and/or be based on, for instance via cryptographic hashing or accumulation, a public key and/or verification datum for which a user, entity, and/or device identified thereby may possess a private key and/or secret; such private key and/or secret may thus be used in transactions performed by the user, entity, and/or device to generate digital signatures that are cryptographically linked to address. In a non-limiting embodiment, immutable sequential listing 192 may include an Ethereum address, Bitcoin address, and the like thereof. For example and without limitation, apparatus 100 may operate within decentralized platform 104 which may include a decentralized exchange platform. The decentralized exchange platform may serve as a hub for which apparatus 100 may receive NFTs to be deployed onto specific blockchains for specific cryptocurrency such as Ethereum, Bitcoin, and the like thereof. Each cryptocurrency employs its own unique blockchain and address for which apparatus 100 may connect to for which apparatus 100 may conduct a plurality of NFT trades with different kinds of cryptocurrency used by creators. Persons skilled in the art, upon reviewing the entirety of this disclosure, will be aware of the various embodiments of deploying an NFT onto some blockchain for purposes as described herein.

With continued reference to FIG. 1, apparatus 100 may deploy an NFT into immutable sequential listing 192 via a smart contract. A "smart contract," as used in this disclosure, is an algorithm, data structure, and/or a transaction protocol which automatically executes, controls, documents, and/or records legally relevant events and actions according to the terms of a contract or an agreement and assign ownership and manage the transferability of the NFT. Objectives of smart contracts may include reduction of need in trusted intermediators, arbitrations and enforcement costs, fraud losses, as well as the reduction of malicious and accidental exceptions. For example and without limitation, processor 140 may receive a creative work and/or NFT tokenizing the creative work from a creator. Processor 140 may receive creative work and broadcast it to and/or post it on a blockchain and/or immutable sequential listing 192 to trigger a smart contract function; smart contract function in turn may create a token and assign it to its owner and/or creator, which may include an owner and/or creator of creative work or an assignee and/or delegee thereof. Smart contracts may permit trusted transactions and agreements to be carried out among disparate, anonymous parties without the need for a central authority, legal system, or external enforcement mechanism. In a non-limiting embodiment, processor 140 may execute a smart contract to deploy an NFT from a creator into immutable sequential listing 192. A smart contract may be configured to conform to various standards, such as ERC-721. A smart contract standard may provide functionalities for smart contracts. In a non-limiting embodiment, a smart contract may be consistent with a conditional NFT trigger 172. In a non-limiting embodiment, apparatus 100 may submit a digitally signed assertion 160 to deploy a smart contract. As a further non-limiting example, a smart contract can contain and/or include in postings representations of one or more agreed upon actions and/or transactions to be performed. A smart contract may contain and/or include payments to be performed, including "locked" payments that are automatically released to an address of a party upon performance of terms of contract. A smart contract may contain and/or include in postings representations of items to be transferred, including without limitation NFTs. Persons skilled in the art, upon reviewing the entirety of this disclosure, will be aware of the various embodiments and implementation of a smart contract for purposes as described herein.

Still referring to FIG. 1, in a non-limiting embodiment, and still referring to FIG. 1, apparatus 100 may generate a plurality of NFT blocks including at least a primary token entry 180 identifying primary NFT 124 and/or primary creative work 112, at least an intervening token entry 188 identifying intervening creative work 12 and/or intervening NFT 132, and at least a secondary token entry 184 identifying a secondary NFT 128 and/or secondary creative work 116 to be added into immutable sequential listing 192. A "token entry," as used in this disclosure, is an entry representing an NFT to be deployed onto immutable sequential listing 192. In a non-limiting embodiment, a token entry may represent a minted NFT. A token entry may represent an NFT that has been confirm and/or verified by a World Computer and deployed onto immutable sequential listing 192. An NFT may be minted into a token entry via digitally signed assertion 164. A "primary token entry," as used in this disclosure is the initial block of immutable sequential listing 192. In a non-limiting embodiment, primary token entry 180 may be a genesis block of a blockchain of immutable sequential listing 192. A "secondary token entry," as used in this disclosure, is an entry and/or a block to be deployed onto some sequential listing such as a blockchain and/or immutable sequential listing 192 containing a cryptographic hash of a prior entry and/or block in the sequential listing such as primary token entry 180 and/or intervening token entry 188. An "intervening token entry," as used in this disclosure, is a token entry containing a cryptographic hash of a prior entry such as primary token entry 180. For example and without limitation, processor 140 may mint intervening NFT 132 into intervening token entry 188 via digitally assigned assertion 164 linking it to primary token entry 180. Primary token entry 180 may be cryptographically linked to intervening token entry 188. Intervening token entry 188 may be cryptographically linked to primary token entry 180 and/or secondary token entry secondary token entry 184 may be cryptographically linked to intervening token entry 188. In some embodiments, apparatus 100 may receive, and/or convert assets into, NFTs and then deploy them onto immutable sequential listing 192. Persons skilled in the art, upon reviewing the entirety of this disclosure, will be aware of the various embodiments of linking token entries based on a chain of creative works associated by each other in the context of blockchain and exchange platforms.

With continued reference to FIG. 1, in a non-limiting embodiment, the blockchain and/or immutable sequential listing 192 may include a plurality of token entries wherein each token entry contains batches of valid transactions that are hashed and encoded into a Merkle tree. Each token entry may include the cryptographic hash of the prior block in the blockchain, linking the two and forming a chain. In a non-limiting embodiment, computing device 108 and/or immutable sequential listing 192 may implement each block as an iterative process that confirm the integrity of the previous block, all the way back to the initial block (e.g. primary token entry 180). In some embodiments, another creative work may be created using at least a portion of secondary creative work. In a non-limiting embodiment, a chain of creative works may be created, thus resulting in a chain of token entries. To assure the integrity of a token entry and the data contained in it, computing device 108 and/or immutable sequential listing 192 may digitally sign each token entry. Persons skilled in the art, upon reviewing the entirety of this disclosure, will be aware of the various embodiments of a block in a blockchain architecture in the context of NFTs.

Further referring to FIG. 1, a token may be used as an element of cryptocurrency and/or cryptographic asset. In some embodiments, a token refers to a cryptocurrency such as Bitcoin. A token, as used in this disclosure, refers to any cryptocurrency and/or cryptographic asset that runs on top of another cryptocurrency such as Bitcoin, Ethereum, Litecoin, and the like thereof. In a non-limiting embodiment, tokens may include DeFi tokens, NFTs, and the like thereof. Persons skilled in the art, upon reviewing the entirety of this disclosure, will be aware of the various embodiments of a token for purposes as described herein.

In a non-limiting embodiment, and still referring to FIG. 1, apparatus 100 may implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grostl hash function, the HAS-160 hash function, the JH hash function, the RadioGatnn hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

With continued reference to FIG. 1, processor 140 may be configured to calculate a contribution metric 156 of primary creative work 112 to the secondary creative work 116. A "contribution metric," as used in this disclosure, is a value, ratio, number, percentage, and the like thereof, describing the amount of which at least a portion of primary creative work 112 is used in the creation of secondary creative 116. In a non-limiting embodiment, contribution metric 156 may be generated with data from the creative works and/or NFTs such as NFT meta data for the calculation of contribution metric 156 which may include proportion of runtime, picture, and/or other overall metric of second work occupied by first work, amount borrowed from first work in second work, importance to overall impact of second work, importance to popularity of second work, or the like. In a non-limiting embodiment, contribution metric 156 may include a calculation based on intervening work 120. For example and without limitation, primary creative work 112 may include an audio file consisting of an instrumental. A second creator may create, using the instrumental of the audio file, a new audio file consisting of a song wherein the second creator creates musical lyrics over the instrumental. Processor 140 may calculate and/or determine a quantifiable contributory value for which primary creative work 112 takes credit for the creation of secondary creative work 116. For example, and without limitation, where half of an audio file included in secondary creative work 116 is an instrumental portion obtained from primary creative work 116 while the other half of the secondary work is a set of original lyrics created for secondary work, processor 140 may calculate that 50% of secondary creative work is made up of at least a portion of primary creative work 112, wherein the at least a portion is denoted and/or included in primary work by way of intervening creative work 120. In some embodiments, contribution metric 156 may be used to control, manage, and/or enforce monetary transactions involving NFTs and their associated creative works such as primary creative work 112, secondary creative work 116 and/or intervening creative work 120. Persons skilled in the art, upon reviewing the entirety of this disclosure, will be aware of the various applications for allocation income in the context of NFTs and creative contribution.

With continued reference to FIG. 1, processor 140 may calculate a creative value for each creative work and/or NFT. In some embodiments, processor 140 may calculate contribution metric 156 based on the creative values of each creative work. A "creative value," as used in this disclosure is a quantifiable value associated with a creative work. In a non-limiting embodiment, a creative value may include a monetary value. A creative value may include a ratio and/or percentage describing the level of originality of a creative work. For example and without limitation, a primary creative value may include a percentage of 100% for originality. In a non-limiting embodiment, a secondary creative value may include a percentage of 70% originality, wherein the remaining 30% is a result of 30% of secondary creative work comprising 30% of at least a portion of creative work from primary creative work 112. In a non-limiting embodiment, specific components of a creative work may have various intrinsic values. For example and without limitation, a creative work may include a digital artwork of an animal as the centerpiece. The animal comprises 50% of the digital artwork, measured by the number of pixels the animal contains relative to the digital artwork as a whole. The remaining 50% of the pixels may form the background of the creative work. To a creator, the animal has a much higher intrinsic value compared to the background, therefore, if the value of the animal may be much larger than half the value of the digital artwork as a whole while the background may be valued at less than half the value of the digital artwork as a whole. Persons skilled in the art, upon reviewing the entirety of this disclosure, will be aware of the various embodiments of intrinsic value for various components of an asset.

With continued reference to FIG. 1, primary NFT 120 and/or primary creative work 112 may be associated with a primary creative value 124. A "primary creative value," as used in this disclosure, is a creative value for primary NFT 120 and/or primary creative work 112. Secondary NFT 128 and/or secondary creative work 116 may be associated with a secondary monetary value 132. A "secondary creative value," as used in this disclosure, is a creative value for secondary NFT 120 and/or secondary creative work 112. In a non-limiting embodiment, each creative value may be calculated and/or generated by computing device 108. In another non-limiting embodiment, computing device 108 may assign a creative value chosen by a creator. Persons skilled in the art, upon reviewing the entirety of this disclosure, will be aware of the various embodiments of a creative value for an asset for purposes as described herein.

With continued reference to FIG. 1, contribution metric 156 may be generated by a contribution metric machine-learning model 144. A "contribution metric machine-learning model," as used in this disclosure, may include any machine-learning model, process, and/or algorithm suitable for use in outputting contribution metric 156. Contribution metric machine-learning model 144 may use primary creative work 112, secondary creative work 116, and/or intervening creative work 120 as inputs. In a non-limiting embodiment, contribution metric machine-learning model 144 may use the creative values of each creative work as inputs. In some embodiments, processor 140 may train contribution metric machine-learning model 144 using a creative ratio training set 140. A "creative ratio training set," as used in this disclosure is a set of training data including an element of creativity and/or overlap between primary creative work 112 and secondary creative work 116 correlated to a payout value. An "element of creative overlap," as used in this disclosure, is a quantifiable value denoting a level of overlap between primary creative work 112 and secondary creative work 116. This may include processor 140 running some algorithm to calculate if at least a portion of creative work, denoted by intervening creative work 120, found in secondary creative work 116 is identical to that of primary creative work 112. In some cases, processor 140 may search through NFT metadata 160 160 of both primary NFT 124 and secondary NFT 128 to determine if any identical information is present, for example and without limitation, the source of the at least a portion of primary creative work 112, process used to create the at least a portion of primary creative work 112, time and date of the at least a portion of primary creative work 112, and the like thereof. An "payout value," as used in this disclosure, is a monetary value, percentage, ratio, agreement, contract, and the like thereof, associated with the element of creative overlap. For example and without limitation, secondary creative work 116 comprising 50% of an asset derived from primary creative work 112 may include a payout value of 50% in which any income generated from the use of secondary creative work 116 and/or secondary NFT 128 must pay 50% of it to the creator and/or owner of primary creative work 112 and/or primary NFT 124. Contribution metric machine-learning model 144 may output contribution metric 156 as a function of creative ratio training set 148. In a non-limiting embodiment, processor 140 may map intervening creative work 120 from primary creative work 112 to the same at least a portion found and used in secondary creative work 116. In a non-limiting embodiment, processor 140 may retrieve creative ratio training set 148 from a contribution metric database 152.

A database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. In a non-limiting embodiment, contribution metric database 152 may store a plurality of creative values and/or contribution metrics assigned to each creative work and/or portion of the creative work. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Figure 3:
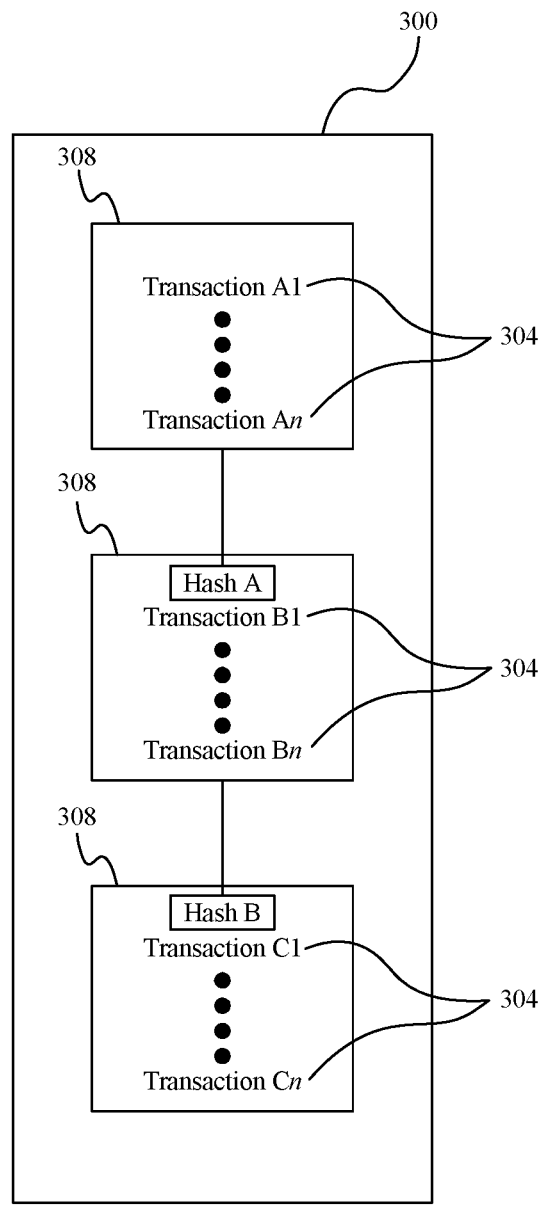
FIG. 3 is a schematic diagram of an exemplary embodiment of an immutable sequential listing.

With continued reference to FIG. 1, processor 140 may generate and/or calculate contribution metric 160 as a function of a recursion as seen in FIG. 3. A "recursion," as used in this disclosure, is a procedure that goes through when one of the steps of the procedure involves invoking the procedure itself. In a non-limiting embodiment, immutable sequential listing 192 may include a chain of NFTs in which computing device 108 may recursively, starting from the last block and/or most recently added block, search through each block until it reaches the genesis block such as primary token entry 180. At each occurrence of a token entry, processor 140 may identify and/or calculate the creative value of the NFT of that token entry to calculate the creative overlap each token entry contains and/or each token entry contains in relation to its prior token entry. Persons skilled in the art, upon reviewing the entirety of this disclosure, will be aware of the various embodiments of the implementation of a recursion in the context of valuating an NFT and/or chain of NFTs.

With continued reference to FIG. 1, processor 140 may be configured to generate a digitally signed assertion 160 as a function of contribution metric 160. A "digitally signed assertion," as used in this disclosure, is a collection of textual data signed using a secure proof and self-execute a contract with the terms of the agreement between a creator of the primary creative work and the creator of a secondary creative work using at least a portion of the primary creative work. Digitally signed assertion 160 may be further described as shown in FIG. 3. In a non-limiting embodiment, digitally signed assertion 164 may be configured to deploy secondary NFT 128 as a function of verifying owner and/or permission by owner of intervening creative work 120 and/or primary creative work 112. In some embodiments, digitally signed assertion 164 may be consistent with the process of minting an NFT. Processor 140 may enable the deployment of an NFT and/or perform digitally signed assertion 164 as a function of a conditional NFT trigger 172. A "conditional NFT trigger," as used in this disclosure, is an occurrence which, once met, deploys an update involving an NFT into immutable sequential listing 192, such as without limitation an update to a smart contract, an unlocking of a locked payment, or the like. In some embodiments, digitally signed assertion 160 may include a process of verifying an owner of an NFT, modifying relevant and allowable metadata, and deploying it a blockchain and/or address such as immutable sequential listing 192. This may be executed by conditional NFT trigger 172. In a non-limiting embodiment, conditional NFT trigger 172 may include verifying the owner of primary NFT 124 and/or intervening NFT 132. This may include confirming secondary NFT 128 and that secondary NFT 128 derives from primary NFT 124 as a function of intervening NFT 132. Confirming may include a plurality of computing devices forming a World Computer connected to immutable sequential listing 192 to verify the transaction. Persons skilled in the art, upon reviewing the entirety of this disclosure, will be aware of the various embodiments of minting an NFT and/or deploying an NFT onto a blockchain for purposes as described herein.

Alternatively or additionally, and still referring to FIG. 1, processor 140 may be configured to generate and/or receive NFT metadata 160 identifying an owner and/or intervening creative work 132 in a creative work such as without limitation secondary creative work 116 and/or secondary NFT 128. An "NFT metadata," as used in this disclosure, is a collection of data providing information about one or more aspects of the data of an NFT. In a non-limiting embodiment, NFT metadata 160 may be used to summarize basic information about the NFT. For example and without limitation, NFT metadata 160 may include basic information involving the NFT such as, but not limited to, means of creation of the NFT purpose of the NFT, time and date of creation, creator or author of the NFT, location on a computer network where the NFT was created, standards used, file size, NFT quality, source of the NFT, process used to create the NFT, and the like thereof. In a non-limiting embodiment, each token may include a meta data of any data. In a non-limiting embodiment, NFTs contain ownership details for easy identification and transfer between token holders. In a non-limiting embodiment, NFT metadata 160 may include information about the creator and/or owner of the NFT. An "owner," as used in this disclosure, is an entity which owns an NFT which further denotes the ownership of the underlying asset tokenized by the NFT. In some cases, a creator and an owner are two different entities. For example and without limitation, a creator of a creative work may mint an NFT for their creative work and becomes the original owner of the NFT. The creator may then hand ownership of their asset to a second entity, thereby transferring ownership of the asset and the NFT to the second owner. In some embodiments, owners can also add metadata or attributes pertaining to the asset in NFTs. For example and without limitation, tokens representing coffee beans can be classified as fair trade. In another non-limiting example, creators can sign their digital artwork with their own signature in the metadata. For example, an NFT may include metadata that describes the size of a virtual asset associated with the NFT such as, its color depth, resolution, when it was created, the shutter speed, and other data. In some embodiments, the digital asset may include a text document in which its metadata may contain information about how long the document is, who the author is, when the document was written, and a short summary of the document. NFT metadata 160 may include a link that accesses a creator's asset and/or creative work. For example and without limitation, an NFT represents a unique asset such as a creative work. The NFT can be thought of as an irrevocable digital certificate of ownership and authenticity for a given asset, whether digital or physical. The NFT contains a metadata which further includes a link that provides access to the unique asset. Persons skilled in the art, upon reviewing the entirety of this disclosure, will be aware of the various embodiments of an NFT in the context of ownership and representation.

With continued reference to FIG. 1, NFT metadata 160 may include properties which identify how much of a creative work of an NFT comprises of outside influences such as intervening creative work 132. For example and without limitation, NFT metadata 160 may include quantitative information about intervening creative work 120 such as an intervening creative value, primary creative value, secondary creative value, and the like thereof. In a non-limiting embodiment, in the event secondary creative work 116 is already tokenized into secondary NFT 128 and minted/deployed onto immutable sequential listing 192, processor 140 may perform digitally signed assertion 164 which may include updating the NFT metadata of secondary NFT 128 to include information identifying intervening creative work 120 and/or primary creative work 112 and their creators and/or owners. Updating the NFT metadata of an already deployed NFT may include updating an NFT that was digitally signed with a smart contract conforming to a standard allowing for the NFT metadata to be modified. Alternatively or additionally, processor 140 may be configured to deploy secondary NFT 128 on immutable sequential listing 192 as a function of conditional NFT trigger 172 in the form of digitally signed assertion 164, wherein conditional NFT trigger 172 includes verifying NFT metadata 160 and that secondary NFT 128 properly identifies intervening NFT 132 and/or intervening creative work 120. In a non-limiting embodiment, in the event a secondary creator intends to tokenize secondary creative work 116, processor 140 may verify that the secondary creator has properly generated NFT metadata 160 which identifies intervening creative work 120 and/or primary creative work 112 and its creator and/or owner. This is so, at least in part, to ensure integrity of an NFT and/or creative work with an intervening creative work prior to minting the NFT onto immutable sequential listing 192 Persons skilled in the art, upon reviewing the entirety of this disclosure, will be aware of the various embodiments of linking creative works and NFTs to which they are derived from for purposes as described herein.

With continued reference to FIG. 1, digitally signed assertion 160 may include a quantitative requirement 176. A "quantitative requirement," as used in this disclosure, is a required monetary condition to be met associated with a primary creative work and a secondary creative work in which both are linked by an intervening creative work. In a non-limiting embodiment, quantitative requirement 176 may be enabled as a function of conditional NFT trigger 172. In some embodiments, quantitative requirement 176 may include a financial contract and/or agreement for which any income generated by secondary creative work 116 must give a portion of that income to the primary creator of primary creative work 112 in which the secondary creator uses intervening work 120 to create secondary creative work 116.

For example and without limitation, the creator of secondary creative work 116 may contain contribution metric 160 of 20% and/or a ratio of 1:5, denoting that 20% of secondary creative work 116 comprises of primary creative work 112 and/or 1 out of every 5 pixels or artistic unit of measurement of secondary creative work 116 comprises that of primary creative work 112. Digitally signed assertion 160 binds secondary creative work 116 to provide 20% and/or 1 out of every 5 unit of currency generated by the trade and/or selling of secondary creative work 116 to the creator and/or owner of primary creative work 112. For example and without limitation, 50% of any income generated from the use of secondary creative work 116 may be given to the creator of primary creative work 112. In another embodiment, processor 140 may enable a creator of primary creative work 112 to associate specific portions of their primary creative work 112 with a creative value for which any other creator must pay to the primary creator for the use of such specific portions. In some embodiments, creators may be enabled to determine manually any payment contracts. Persons skilled in the art, upon reviewing the entirety of this disclosure, will be aware of the various embodiments of a contribution metric in the context of monetization. Persons skilled in the art, upon reviewing the entirety of this disclosure, will be aware of the various embodiments of monetary agreements and contracts in the context of business-related transactions for NFTs.

with continued reference to FIG. 1, contribution metric 152 may be used to generate quantitative requirement 160. In a non-limiting embodiment, processor 140 may generate a quantitative requirement machine-learning process 168 in which quantitative machine-learning process 168 uses contribution metric 160 as an input to generate an output of quantitative requirement 176. A "quantitative machine-learning process," as used in this disclosure, is any machine-learning model, process, and/or algorithm used to generate a quantitative requirement. In some embodiments, processor 140 may train quantitative requirement machine-learning process 168 using a quantitative requirement training set. A "quantitative requirement training set," as used in this disclosure, is a training data including an element of intrinsic value correlated to an element of a quantitative requirement. The quantitative requirement training set may be retrieved from contribution metric database 152. An "element of intrinsic value," as used in this disclosure, is the intrinsic value of the components making up a creative work of an NFT. For example and without limitation, primary creative work may include a video recording of a person singing an original song. A second creator may use the audio file (e.g. the original song) to create secondary creative work 116 which is another video recording, wherein the audio file is intervening creative work 120. The audio file of primary creative work 112 may be calculated to be 50% of primary work while the video is the remaining 50%. This may be denoted by contribution metric 160. However, the original song may have a higher intrinsic value comparted to the video in which quantitative requirement machine-learning process 168 may correlate that intrinsic value to an element of quantitative requirement. Although intervening creative work 120 may be 50% of primary creative work 112, it may have a creative value that is more than 50% of the total creative value of primary creative work 112. Persons skilled in the art, upon reviewing the entirety of this disclosure, will be aware of the various embodiments of differing intrinsic value for certain aspects of a creative work for purposes as described herein. In a non-limiting embodiment, the quantitative requirement training set may be retrieved from contribution metric database 152. Quantitative requirement machine-learning process 168 may output quantitative requirement 176 as a function of the quantitative requirement training set.

In a non-limiting embodiment, and still referring to FIG. 1, quantitative requirement 176 may include a variety of agreement types. For example and without limitation, primary creative work 112 may be sold off to a buyer through quantitative requirement 176 which requires the creator of primary creative work 112 to receive a royalty payment of any income generated by primary creative work 112. A "royalty," as used in this disclosure, is a type of payment that buys the right to use someone else's property. A secondary creator may buy the right to use primary creative work 112 from the primary creator to create secondary creative work 116. The secondary creator may use secondary creative work 116 for any purpose in which any income generated from the trade, sell, and/or loan of secondary creative work 116 and must provide a royalty payment such as 8% of every income generated from using secondary creative work 116 as it uses property of primary creative work 112, which may be denoted by quantitative requirement 176. In some embodiments, a chain of buyers and/or borrowers may receive a chain of permissions which form a chain of royalty payments that produce an income stream back to each owner and all the way to the owner and/or creator of the primary creator. In a non-limiting embodiment, processor 140 may generate quantitative requirement 176 which tracks every transaction of income flow for each NFT and/or creative work. Persons skilled in the art, upon reviewing the entirety of this disclosure, will be aware of the various embodiments of implementing a digitally signed assertion to enable royalty payments for purposes as described herein.

In a non-limiting embodiment, and still referring to FIG. 1, processor 140 may generate quantitative requirement 176 for which the NFT deployed via digitally signed assertion 160 may include a commodity for sale for which a buyer may purchase. In a non-limiting embodiment, quantitative requirement 176 may include limitations and restrictions for the purchase of an NFT. In a non-limiting embodiment, an NFT along with its quantitative requirement 176 may be publicly accessible in the blockchain of immutable sequential listing 192 for a potential buyer to purchase. In some embodiments, quantitative requirement 176 may include an NFT option trade and/or enable an NFT option trade. An "NFT option trade," as used in this disclosure, is a type of derivative security for NFTs in which an NFT is intrinsically linked to the price of something else. For example and without limitation, if a buyer buys the NFT option denoted by quantitative requirement 176. If a buyer purchases an NFT option trade, the buyer is granted the right but not the obligation to buy or sell the underlying asset (NFT) at a set price on or before a certain date. In some embodiments, NFT option may include an NFT call option and/or an NFT put option. An "NFT call option," as used in this disclosure, is financial contract that gives a buyer of an NFT the right but not the obligation to buy the NFT at a specified price within a specific time period. The NFT may be called the underlying asset. A call buyer profits when the underlying asset increases in price. In another embodiment, NFT option 160 may include an NFT put option. An "NFT put option," as used in this disclosure, is s a contract giving the buyer the right, but not the obligation, to sell—or sell short—a specified amount of an underlying asset such as an NFT at a predetermined price within a specified time frame. This predetermined price at which the buyer of the put option can sell the underlying asset is called the strike price. Persons skilled in the art, upon reviewing the entirety of this disclosure, will be aware of the various embodiments and implementations of derivative securities in the context of financial contracts for NFTs.

With continued reference to FIG. 1, quantitative requirement 176 may include a loan contract. For example and without limitation, quantitative requirement 176 may state that a buyer may use an NFT and for a fixed period of time for a given price. In some cases, a buyer and/or borrower may purchase this digitally signed assertion and generate the same contract to loan to another buyer and/or borrower for a given price. After the underlying fixed period of time, the NFT is returned to its original owner. In a non-limiting embodiment, a buyer and/or borrower may use the loaned NFT for any purposes, including monetary purpose but not limited to royalty payments but a fixed fee for borrowing the NFT. Persons skilled in the art, upon reviewing the entirety of this disclosure, will be aware of the various embodiments and types of financial contracts in the context of trading NFTs.

Figure 2:
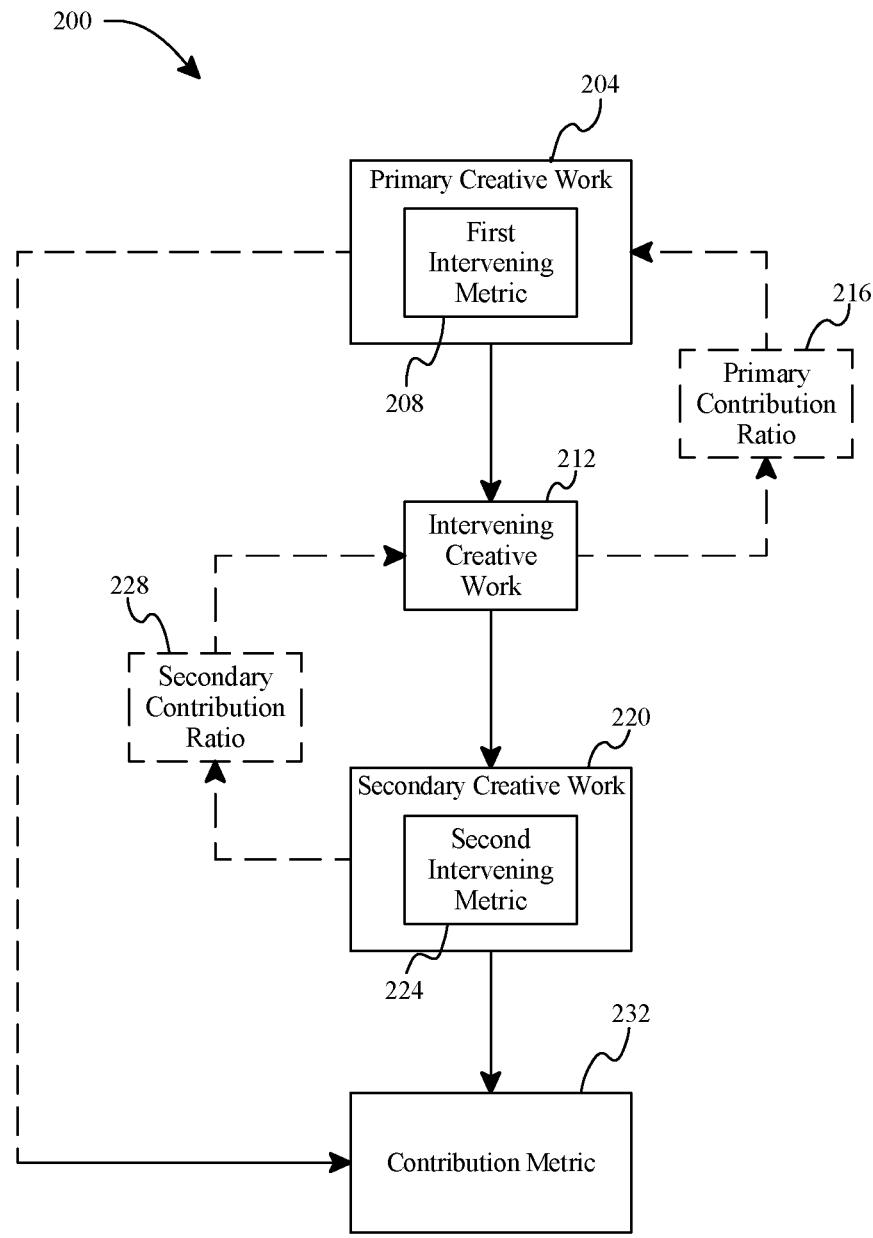
FIG. 2 is a block diagram of an exemplary embodiment of a recursion for generating a contribution metric.

Referring now to FIG. 2, a block diagram of an exemplary embodiment of a recursion 200 for generating a contribution metric is illustrated. As shown in FIG. 2, primary creative work 204 may include a first intervening metric 208. A "first intervening metric," as used in this disclosure, is a contribution metric that denotes a creative value of a portion of primary creative work 204 that is being used as intervening work 212. Secondary creative work 220 may be created based on primary creative work 204 and/or intervening creative work 212. Secondary creative work 220 is associated with a second intervening metric 224. A "second intervening metric 224," as used in this disclosure, is a contribution metric that denotes a creative value of intervening work 212 proportionally scaled to a contribution metric of secondary creative work 220. For example and without limitation, intervening work 212 may include a creative value of $1,000. The secondary creative value may be $500, wherein secondary creative work 220 comprises elements of primary creative work 204 and/or intervening creative work 212, wherein the elements of primary creative work 204 and/or intervening creative work 212 is 50% of the total composition of secondary creative work 220. Although intervening creative work 212 contains a creative value of $1,000, second intervening metric 224 may be a value of $250 as half of secondary creative work 220 is intervening creative work 212. Values may be computed and/or measured according to any currency including fiat currency, virtual currency, cryptocurrency, or the like. Persons skilled in the art, upon reviewing the entirety of this disclosure, will be aware of the various embodiments of the value and price for contributory creations in the context of pricing.

Still referring to FIG. 2, based on the level of creative overlap and/or amount of secondary creative work 212 comprises elements of primary creative work 204 (intervening work 212), a primary contribution ratio 216 may be generated. A "contribution ratio," as used in this disclosure, is a level of overlap and/or quantitative relation between two creative works. Primary contribution ratio 216 may include a quantitative relation between primary creative work 204 and secondary creative work 220 in which primary creative work 204 is the underlaying creative work in which secondary creative work 220 derives from. In a non-limiting embodiment, second intervening metric 224 may be generated as a function of secondary contribution ratio 228.

Still referring to FIG. 2, a chain of creative works may be created. In a non-limiting embodiment, secondary creative work 220 may be the underlying creative work used in the creation of further creative works. In some embodiments, those further creative works may include their own creative values and intervening metrics. In some embodiments, the chain of creative works may include any number of creative works derived from one another. Persons skilled in the art, upon reviewing the entirety of this disclosure, will be aware of the various embodiments in which creative works are linked for purpose as described herein.

With continued reference to FIG. 2, a computing device may be configured to recursively trickle back from the last entry of a chain of NFTs and/or creative work. In a non-limiting embodiment, a processor may trickle back from the most recent and/or last creative work, tokenized into an NFT, back to the origin such as primary creative work 204. In some cases primary creative work 204 and its associated NFT may be denoted as a genesis token entry. At each NFT token entry and/or creative work, the processor may calculate a creative value and/or intervening metric of each non-fungible token and/or creative work. The processor may then generate contribution metric as a function of each contribution ratio, intervening metric, and/or creative value of each creative work and/or NFT token it passed through until reaching the genesis token entry (primary NFT). Persons skilled in the art, upon reviewing the entirety of this disclosure, will be aware of the various embodiments and procedures in calculating a contribution metric in the context of recursion.

Referring now to FIG. 3, an exemplary embodiment of an immutable sequential listing s illustrated. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. Immutable sequential listing 300 may be consistent with immutable sequential listing 192. An immutable sequential listing may be, include and/or implement an immutable ledger, where data entries that have been posted to the immutable sequential listing cannot be altered. Data elements are listing in immutable sequential listing 300; data elements may include any form of data, including textual data, image data, encrypted data, cryptographically hashed data, and the like. Data elements may include, without limitation, one or more at least a digitally signed assertions. In one embodiment, a digitally signed assertion 304 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 304. In an embodiment, collection of textual data states that the owner of a certain transferable item represented in a digitally signed assertion 304 register is transferring that item to the owner of an address. A digitally signed assertion 304 may be signed by a digital signature created using the private key associated with the owner's public key, as described above.

Still referring to FIG. 3, a digitally signed assertion 304 may describe a transfer of virtual currency, such as crypto currency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g. a ride share vehicle or any other asset. A digitally signed assertion 304 may describe the transfer of a physical good; for instance, a digitally signed assertion 304 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 304 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 3, in one embodiment, an address is a textual datum identifying the recipient of virtual currency or another item of value in a digitally signed assertion 304. In some embodiments, address is linked to a public key, the corresponding private key of which is owned by the recipient of a digitally signed assertion 304. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 304 may record a subsequent a digitally signed assertion 304 transferring some or all of the value transferred in the first a digitally signed assertion 304 to a new address in the same manner. A digitally signed assertion 304 may contain textual information that is not a transfer of some item of value in addition to, or as an alternative to, such a transfer. For instance, as described in further detail below, a digitally signed assertion 304 may indicate a confidence level associated with a distributed storage node as described in further detail below.

In an embodiment, and still referring to FIG. 3 immutable sequential listing 300 records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 300 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 3, immutable sequential listing 300 may preserve the order in which the at least a posted content took place by listing them in chronological order; alternatively or additionally, immutable sequential listing 300 may organize digitally signed assertions 304 into sub-listings 308 such as "blocks" in a blockchain, which may be themselves collected in a temporally sequential order; digitally signed assertions 304 within a sub-listing 308 may or may not be temporally sequential. Each of sub-listing 308 may include an NFT token and/or token entry as described in FIG. 1. The ledger may preserve the order in which at least a posted content took place by listing them in sub-listings 308 and placing the sub-listings 308 in chronological order. The immutable sequential listing 300 may be a distributed, consensus-based ledger, such as those operated according to the protocols promulgated by Ripple Labs, Inc., of San Francisco, Calif., or the Stellar Development Foundation, of San Francisco, Calif., or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger, but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 300 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 3, immutable sequential listing 300, once formed, may be inalterable by any party, no matter what access rights that party possesses. For instance, immutable sequential listing 300 may include a hash chain, in which data is added during a successive hashing process to ensure non-repudiation. Immutable sequential listing 300 may include a block chain. In one embodiment, a block chain is immutable sequential listing 300 that records one or more new at least a posted content in a data item known as a sub-listing 308 or "block." An example of a block chain is the BITCOIN block chain used to record BITCOIN transactions and values. Sub-listings 308 may be created in a way that places the sub-listings 308 in chronological order and link each sub-listing 308 to a previous sub-listing 308 in the chronological order so that any computing device may traverse the sub-listings 308 in reverse chronological order to verify any at least a posted content listed in the block chain. Each new sub-listing 308 may be required to contain a cryptographic hash describing the previous sub-listing 308. In some embodiments, the block chain contains a single first sub-listing 308 sometimes known as a "genesis block." The genesis block may include the primary token entry as shown in FIG. 1.

Still referring to FIG. 3, the creation of a new sub-listing 308 may be computationally expensive; for instance, the creation of a new sub-listing 308 may be designed by a "proof of work" protocol accepted by all participants in forming the immutable sequential listing 300 to take a powerful set of computing devices a certain period of time to produce. Where one sub-listing 308 takes less time for a given set of computing devices to produce the sub-listing 308 protocol may adjust the algorithm to produce the next sub-listing 308 so that it will require more steps; where one sub-listing 308 takes more time for a given set of computing devices to produce the sub-listing 308 protocol may adjust the algorithm to produce the next sub-listing 308 so that it will require fewer steps. As an example, protocol may require a new sub-listing 308 to contain a cryptographic hash describing its contents; the cryptographic hash may be required to satisfy a mathematical condition, achieved by having the sub-listing 308 contain a number, called a nonce, whose value is determined after the fact by the discovery of the hash that satisfies the mathematical condition. Continuing the example, the protocol may be able to adjust the mathematical condition so that the discovery of the hash describing a sub-listing 308 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 308 according to the protocol is known as "mining." The creation of a new sub-listing 308 may be designed by a "proof of stake" protocol as will be apparent to those skilled in the art upon reviewing the entirety of this disclosure.

Continuing to refer to FIG. 3, in some embodiments, protocol also creates an incentive to mine new sub-listings 308. The incentive may be financial; for instance, successfully mining a new sub-listing 308 may result in the person or entity that mines the sub-listing 308 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 308 Each sub-listing 308 created in immutable sequential listing 300 may contain a record or at least a posted content describing one or more addresses that receive an incentive, such as virtual currency, as the result of successfully mining the sub-listing 308.

With continued reference to FIG. 3, where two entities simultaneously create new sub-listings 308, immutable sequential listing 300 may develop a fork; protocol may determine which of the two alternate branches in the fork is the valid new portion of the immutable sequential listing 300 by evaluating, after a certain amount of time has passed, which branch is longer. "Length" may be measured according to the number of sub-listings 308 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 308 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 300 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing 300.

Still referring to FIG. 3, additional data linked to at least a posted content may be incorporated in sub-listings 308 in the immutable sequential listing 300; for instance, data may be incorporated in one or more fields recognized by block chain protocols that permit a person or computer forming a at least a posted content to insert additional data in the immutable sequential listing 300. In some embodiments, additional data is incorporated in an unspendable at least a posted content field. For instance, the data may be incorporated in an OP_RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 3, in some embodiments, virtual currency is traded as a crypto currency. In one embodiment, a crypto currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto currency may be centralized, with its protocols enforced or hosted by a particular entity. For instance, crypto currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 308 in a block chain computationally challenging; the incentive for producing sub-listings 308 may include the grant of new crypto currency to the miners. Quantities of crypto currency may be exchanged using at least a posted content as described above.

Figure 4:
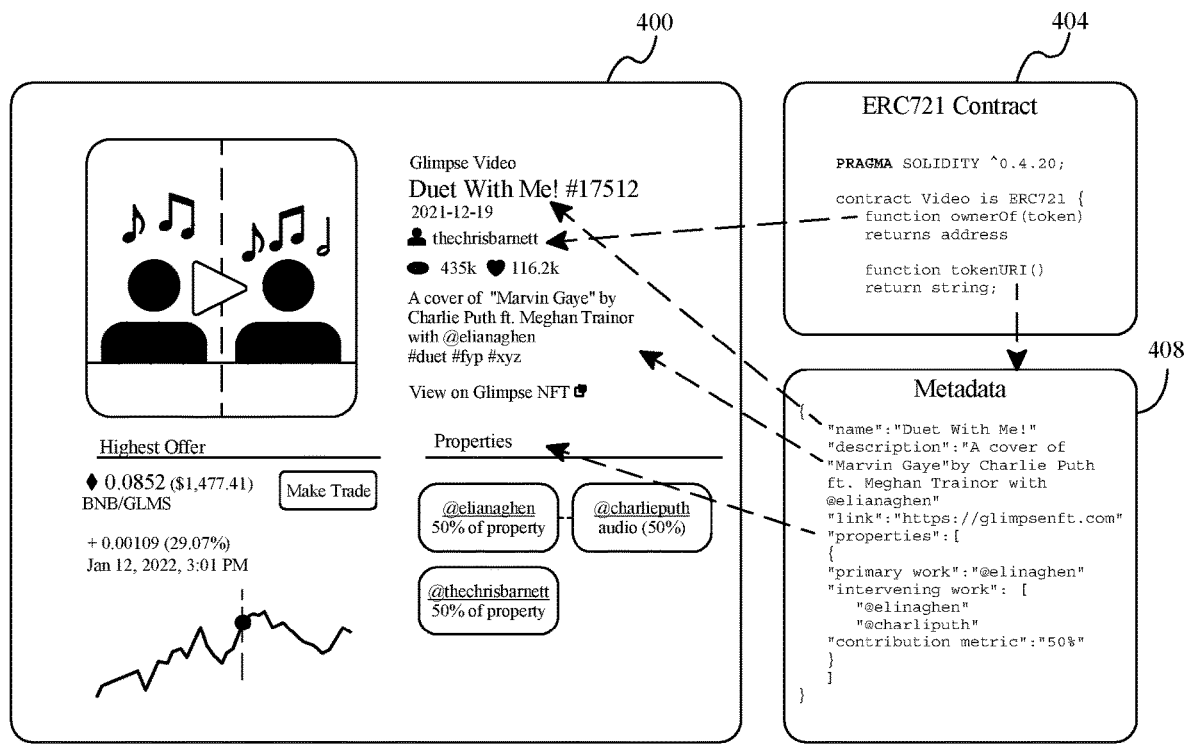
FIG. 4 is an illustration of an exemplary embodiment of a non-fungible token metadata.

Now referring to FIG. 4. an exemplary embodiment of a non-fungible token metadata is illustrated. As shown in FIG. 4, an NFT page 400 may include a plurality of information related to an NFT. In some embodiments, NFT page 400 may be incorporated into the NFT itself. NFT page 400 may include quantitative information such as contribution metric, creative value, price, NFT views, NFT likes, creation/mint date, and the like thereof. NFT page 400 may further include information about the creator and/or owner of the NFT, the type of asset NFT embodies, description of the NFT, and at least a link for which the NFT may be publicly accessible. In a non-limiting embodiment, NFT page 400 may be a representation of a decentralized platform and/or decentralized exchange platform for which creators, buyers, sellers, and/or any user may interface with. Persons skilled in the art, upon reviewing the entirety of this disclosure, will be aware of the various embodiments and information displayed in the context of NFTs.

Still referring to FIG. 4, an NFT may be deployed via a digitally signed smart contract which conforms to some standard 404. As shown in FIG. 4, standard 404 displays technical information denoting the type of standard the NFT conforms to. In some embodiments, standard 404 may include information of a smart contract that was digitally signed and contains immutable information such as the identity of the creator. Standard 404 may also include information denoting the metadata of the NFT. The metadata may be modified depending on the standard the NFT conforms too.

With continued reference to FIG. 4, metadata 408 may include a collection of information about the NFT and/or NFT page 400. In some embodiments, metadata 408 may include information identifying the creative influence and/or contribution from other creative works. For example and without limitation, the NFT as seen in NFT page 404 includes a video of a duet. The creator of the NFT (@thechrisbarnett) uses another NFT and its video created by a different creator (@elianaghen) to create the duet. Metadata 408 may include information the embodies the incorporated creative work. Metadata 408, based on the standard to which the NFT conforms to, may be modified to identify the origin and/or creator of the video that @thechrisbarnett uses which may be consistent with an intervening creative work as described above. In some cases, even the intervening creative work may include another intervening creative work. As shown in FIG. 4, the creative work of @elianaghen also incorporates an intervening work in which the intervening work was created by a creator @charlieputh. As shown in FIG. 4, @elianaghen uses the audio from the creative work created by @charlieputh, which is then used by @thechrisbarnett. This chain of information and creative works may be established via metadata 408 and as seen in NFT page 404 which may be configured to provide proper credit to all the creators involved. Persons skilled in the art, upon reviewing the entirety of this disclosure, will be aware of the various embodiments of creative works and NFTs in the context of establishing credit.

Referring now to FIG. 5, an exemplary embodiment of a system 500 for a trusted computing architecture is illustrated. "Trusted computing," as used in this disclosure, is a technology enabling hardware and/or hardware manufacturers to exert control over what software does and does not run on a system by refusing to run unsigned software, and/or to make all software that does run auditable and transparent. In a non-limiting embodiment, trusted computing may which system 512 and application 508 perform one or more actions, determinations, calculations, or the like as described in this disclosure, including without limitation such actions, determinations, calculations, or the like a creator uses to access data 504 which may be stored in an immutable sequential listing. Trusted computing may also enable integrated data privacy involving NFTs in the launching of the NFTs onto a decentralized exchange platform. Trusted computing may include a plurality of features such as, but not limited to, secure boot configured to allow an operating system to boot into a defined and trusted configuration, curtained memory configured to provide strong memory isolation, a memory configured to be unreadable by other processes including operating systems and debuggers, sealed storage configured to allow software to keep cryptographically secure secrets, secure I/O thwarts configured to attack key-stroke loggers and screen scrapers, integrity measurement configured to compute hashes of executable code, configuration data, and other system state information, and remote attestation configured to allow a trusted device to present reliable evidence to remote parties about the software it is running.

In a non-limiting embodiment, and still referring to FIG. 5, trusted computing may include a secure coprocessor and/or cryptoprocessor such as without limitation a Trusted Platform Module (TPM) 520. A "Trusted Platform Module," as used in this disclosure, is a tamper resistant piece of cryptographic hardware built onto a system board or other hardware that implements primitive cryptographic functions on which more complex features can be built. A client machine 516 may be integrated with TPM 520 architecture which a server machine 524 may verify. In a non-limiting embodiment, client machine 516 may be consistent with a computing device as described in the entirety of this disclosure. In another non-limiting embodiment, client machine 516 may be consistent with apparatus 100. In a non-limiting embodiment, TPM may be configured to serve as a local root of trust for the operations of attestation. TPM may be capable of a plurality of security measures such as, but not limited to, performing public key cryptographic operations, computing hash functions, key management and generation, secure storage of keys and other secret data, random number generation, integrity measurement, attestation, digital signatures, and the like thereof. In a non-limiting embodiment, the TPM may be manufactured with a public and private key pair, or more generally a secret datum that may be verified using a secure proof, built as an endorsement key (EK) built into hardware, such as without limitation read-only memory (ROM) or the like. An "endorsement key," as used in this disclosure, is encryption key or other secret datum that is permanently embedded in Trusted Platform Module (TPM) security hardware. In a non-limiting embodiment, the EK is unique to a particular TPM and is signed by a trusted server machine 524 such as a certification authority (CA). A "certificate authority," as used in this disclosure, is an entity that issues digital certificates.

In a non-limiting embodiment and still referring to FIG. 5, a TPM may perform an integrity measurement to enable a user and/or process access to private data. An "integrity measurement," as used in this disclosure, is a technique to enable a party to query the integrity status of software running on a platform, e.g., through attestation challenges. In a non-limiting embodiment, an integrity measurement may include the process by which information about the software, hardware, and configuration of a system is collected and digested. For example and without limitation, at load-time, TPM may use a hash function to fingerprint an executable, an executable plus its input data, or a sequence of such files. These hash values may be used in attestation to reliably establish code identity to remote or local verifiers such as server machine 524. Hash values can also be used in conjunction with a sealed storage feature. A secret may be sealed along with a list of hash values of programs that are allowed to unseal the secret. This may allow creation of data files that can only be opened by specific applications.

With continued reference to FIG. 5, the TPM may also include security protocols such as attestations. An "attestation," as used in this disclosure, is a mechanism for software to prove and/or record its identity and/or execution history. Attestation may include creating a measurement, or cryptographic hash, of a process's executable code, inputs, and/or outputs, which may be signed by a TPM; this may create a tamper-proof and verifiable record of exactly what process has been performed, with a TPM signature proving that the measurement was performed by and/or with the TPM and on the device indicated. A goal of attestation may be to prove to a remote party that an operating system, main program, and/or application software are intact and trustworthy. A verifier of an attestation may trust that attestation data is accurate because it is signed by TPM 520 whose key may be certified by a CA. Attestation may include a remote attestation. A "remote attestation," as used in this disclosure, is method by which a host (client) authenticates it's hardware and software configuration to a remote host (server). The goal of remote attestation is to enable a remote system (challenger) to determine the level of trust in the integrity of platform of another system (attestator). Remote attestation also allows a program to authenticate itself. In some embodiments, remote attestation and remote attestation is a means for one system to make reliable statements about the software it is running to another system. A remote party can then make authorization decisions based on that information. In a non-limiting embodiment, attestation may be performed by TPM 520 configured to serve as a local root of trust for the operations of attestation. In another non-limiting embodiment, an attestation may include a direct anonymous attestation (DAA). A "direct anonymous attestation," as used in this disclosure, is a cryptographic primitive which enables remote authentication of a trusted computer whilst preserving privacy of the platform's user. Persons skilled in the art, upon reviewing the entirety of this disclosure, will be aware of the various embodiments of an attestation protocol for purposes as described herein. Any and all processes and/or process steps performed herein may be measured; measurements and/or any suitable representation thereof, including cryptographic accumulators containing such measurements, may be posted to immutable sequential listing, for instance and without limitation in combination with measured process steps.

Figure 6:
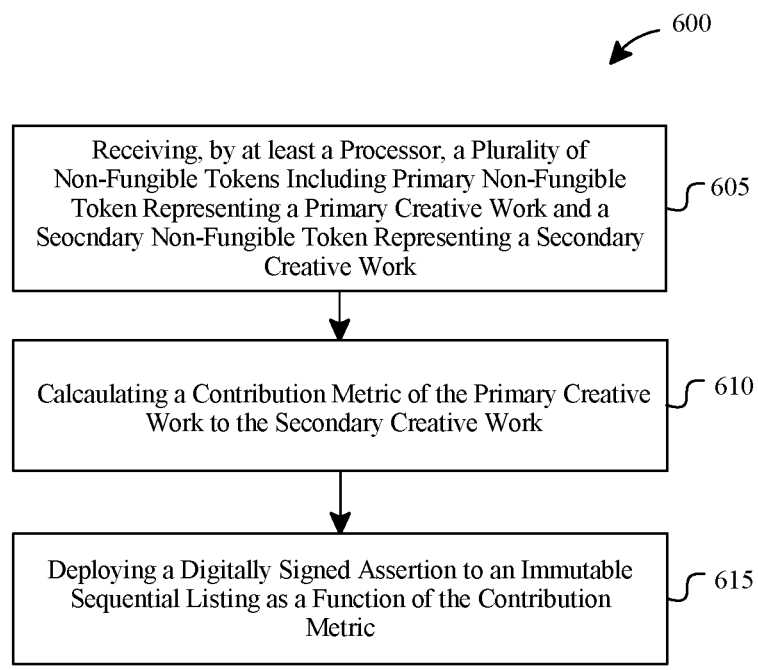
FIG. 6 is a flow diagram of an exemplary embodiment of a method for revenue sharing of non-fungible tokens.

Now referring to FIG. 6, a flow diagram of an exemplary embodiment of a method 600 for proportional calculation regarding non-fungible tokens is illustrated. At step 605, method 600 includes receiving, by at least a processor communicatively connected to at least a memory, a plurality of non-fungible tokens, wherein the plurality of non-fungible tokens includes a primary non-fungible token representing a primary creative work and a secondary non-fungible token representing a secondary creative work, wherein the secondary work comprises at least a portion of the primary creative work. The at least a processor may include any processor as described herein. The memory may include any memory as described herein. The plurality of NFTs may include any plurality of NFTs as described herein. Method 600 may include receiving a primary NFT representing a primary creative work, an intervening NFT representing at least an intervening creative work, and/or a secondary NFT representing a secondary creative work. In a non-limiting embodiment, method 600 may include a decentralized platform for which the at least a processor may receive the plurality of NFTs. In some embodiments, method 600 may include enabling creators to tokenize their creative works into NFTs. Persons skilled in the art, upon reviewing the entirety of this disclosure, will be aware of the various methods of receiving and/or generating an NFT for purposes as described herein.

In a non-limiting embodiment, and still referring to FIG. 6, method 600 may include deploying the plurality of NFTs onto an immutable sequential listing. The immutable sequential listing may be consistent with any immutable sequential listing as described herein. In a non-limiting embodiment, method 600 may include minting and/or mining an NFT to be deployed onto immutable sequential listing. In some embodiments, the at least a processor may tokenize and mint creative works and NFTs. Persons skilled in the art, upon reviewing the entirety of this disclosure, will be aware the various methods for converting an asset into a cryptographic asset for purposes as described herein.

still referring to FIG. 6, at step 610, method 600 includes calculating a contribution metric of the primary creative work to the secondary creative work. The contribution metric may include any contribution metric as described herein. In a non-limiting embodiment, creating the contribution value may include calculating the creative value of each creative work and/or NFT such as primary creative work and secondary creative work. In another non-limiting embodiment, calculating the contribution metric may include calculating some proportion and/or ratio between the relationship of a primary creative work and a secondary creative work. In some embodiments, method 600 may include training, by the computing device, a contribution metric machine-learning model using a creative ratio training set, wherein the creative ratio training set comprises an element of creative overlap between the primary creative work and the secondary creative work correlated to a payout value and outputting the creative value as a function of the creative ratio training set. Persons skilled in the art, upon reviewing the entirety of this disclosure, will be aware of the various methods of implementing a machine-learning model for purposes as described herein.

Still referring to FIG. 6, method 600 may include calculating the contribution metric as a function of a recursion and/or recursive process. In a non-limiting embodiment, method 600 may include generating the contribution metric as a function of the at least an intervening creative work. Method 600 may include generating, by the processor, a first intervening metric as a function of the at least an intervening creative work and the primary creative work, generating a second intervening metric as a function of the at least an intervening creative work and the secondary creative work, and generating the contribution metric as a function of the first intervening metric and the second intervening metric. Persons skilled in the art, upon reviewing the entirety of this disclosure, will be aware of the various methods and embodiments of calculating the contribution metric in the context of recursion.

Still referring to FIG. 6, at step 615, method 600 includes deploying a digitally signed assertion as a function of the contribution metric. The digitally signed assertion may be consistent with any digitally signed assertion as described herein. In a non-limiting embodiment, generating the digitally signed assertion may include generating a quantitative requirement. The quantitative requirement may include any quantitative requirement as described herein. In a non-limiting embodiment, method 600 may include generating the quantitative requirement as a function of a quantitative requirement machine-learning process. The quantitative requirement machine-learning process may include any quantitative requirement machine-learning process as described herein. In a non-limiting embodiment, method 600 may including posting a digitally signed assertion as a function of a conditional NFT trigger. The conditional NFT trigger may include any conditional NFT trigger. In a non-limiting embodiment, digitally signed assertion may include the conditional NFT trigger wherein the conditional NFT trigger may be activated as a function of verifying the secondary NFT and that the secondary NFT derives from the primary NFT. The conditional NFT trigger may be activated as a function of the quantitative requirement which may establish the link between the secondary NFT to the intervening NFT and/or primary NFT for which any income generated may flow through.

In a non-limiting embodiment, and still referring to FIG. 6, method 600 may include generating a plurality of NFT token entries to be deployed onto the immutable sequential listing. The plurality of token entries may include any plurality of token entries as described herein. In some embodiments, the immutable sequential listing may include a blockchain. In a non-limiting embodiment, method 600 may include enabling the trading of the plurality of the NFTs as a function of the decentralized platform. In a non-limiting embodiment, method 600 may include posting the digitally signed assertion as a function of updating an NFT metadata. The NFT metadata may include any NFT metadata as described herein. In a non-limiting embodiment, the processor may update the NFT metadata of secondary NFT to include information linking the secondary NFT to the intervening NFT and/or primary NFT. Method 600 may include linking secondary token entry representing the secondary NFT to the primary token entry representing the primary NFT via the intervening token entry representing the intervening NFT as a function of a cryptographic hash. Persons skilled in the art, upon reviewing the entirety of this disclosure, will be aware of the various embodiments and methods of generating token entries to be confirmed and added into a blockchain for purposes as described herein.

Figure 7:
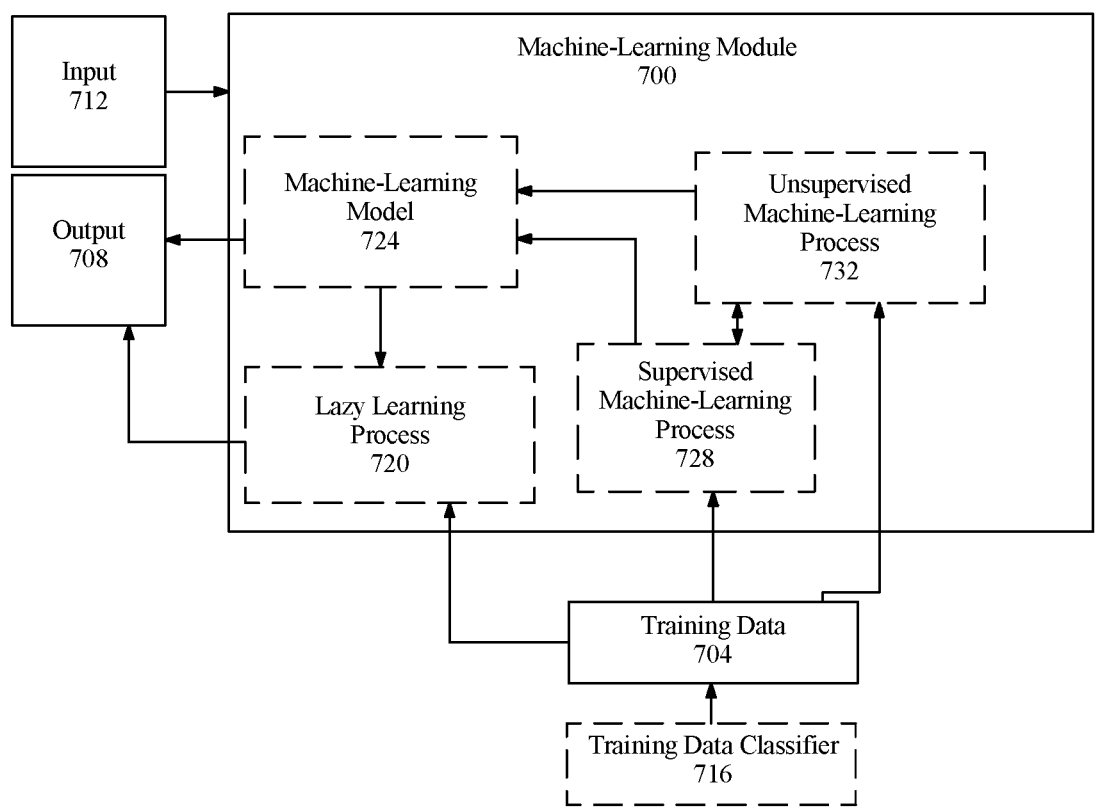
FIG. 7 is a block diagram of an exemplary embodiment of a machine-learning model.

Referring now to FIG. 7, an exemplary embodiment of a machine-learning module 700 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 704 to generate an algorithm that will be performed by a computing device/module to produce outputs 708 given data provided as inputs 712; this is in contrast to a non-machine learning software program where the commands to be executed are determined in advance by a user and written in a programming language.

Still referring to FIG. 7, "training data," as used herein, is data containing correlations that a machine-learning process may use to model relationships between two or more categories of data elements. For instance, and without limitation, training data 704 may include a plurality of data entries, each entry representing a set of data elements that were recorded, received, and/or generated together; data elements may be correlated by shared existence in a given data entry, by proximity in a given data entry, or the like. Multiple data entries in training data 704 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 704 according to various correlations; correlations may indicate causative and/or predictive links between categories of data elements, which may be modeled as relationships such as mathematical relationships by machine-learning processes as described in further detail below. Training data 704 may be formatted and/or organized by categories of data elements, for instance by associating data elements with one or more descriptors corresponding to categories of data elements. As a non-limiting example, training data 704 may include data entered in standardized forms by persons or processes, such that entry of a given data element in a given field in a form may be mapped to one or more descriptors of categories. Elements in training data 704 may be linked to descriptors of categories by tags, tokens, or other data elements; for instance, and without limitation, training data 704 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 7, training data 704 may include one or more elements that are not categorized; that is, training data 704 may not be formatted or contain descriptors for some elements of data. Machine-learning algorithms and/or other processes may sort training data 704 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 704 to be made applicable for two or more distinct machine-learning algorithms as described in further detail below. Training data 704 used by machine-learning module 700 may correlate any input data as described in this disclosure to any output data as described in this disclosure.

Further referring to FIG. 7, training data may be filtered, sorted, and/or selected using one or more supervised and/or unsupervised machine-learning processes and/or models as described in further detail below; such models may include without limitation a training data classifier 716. Training data classifier 716 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 700 may generate a classifier using a classification algorithm, defined as a processes whereby a computing device and/or any module and/or component operating thereon derives a classifier from training data 704. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 716 may classify elements of training data to a contribution metric, intrinsic value, and the like thereof, for which a subset of training data may be selected.

Still referring to FIG. 7, machine-learning module 700 may be configured to perform a lazy-learning process 720 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 704. Heuristic may include selecting some number of highest-ranking associations and/or training data 704 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 7, machine-learning processes as described in this disclosure may be used to generate machine-learning models 724. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 724 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 724 may be generated by creating an artificial neural network, such as a convolutional neural network including an input layer of nodes, one or more intermediate layers, and an output layer of nodes. Connections between nodes may be created via the process of "training" the network, in which elements from a training data 704 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 7, machine-learning algorithms may include at least a supervised machine-learning process 728. At least a supervised machine-learning process 728, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include any input as described above as inputs, any output as described above as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 704. Persons skilled in the art, upon reviewing the entirety of this disclosure, will be aware of various possible variations of at least a supervised machine-learning process 728 that may be used to determine relation between inputs and outputs. Supervised machine-learning processes may include classification algorithms as defined above.

Further referring to FIG. 7, machine learning processes may include at least an unsupervised machine-learning processes 732. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 7, machine-learning module 700 may be designed and configured to create a machine-learning model 724 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 7, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
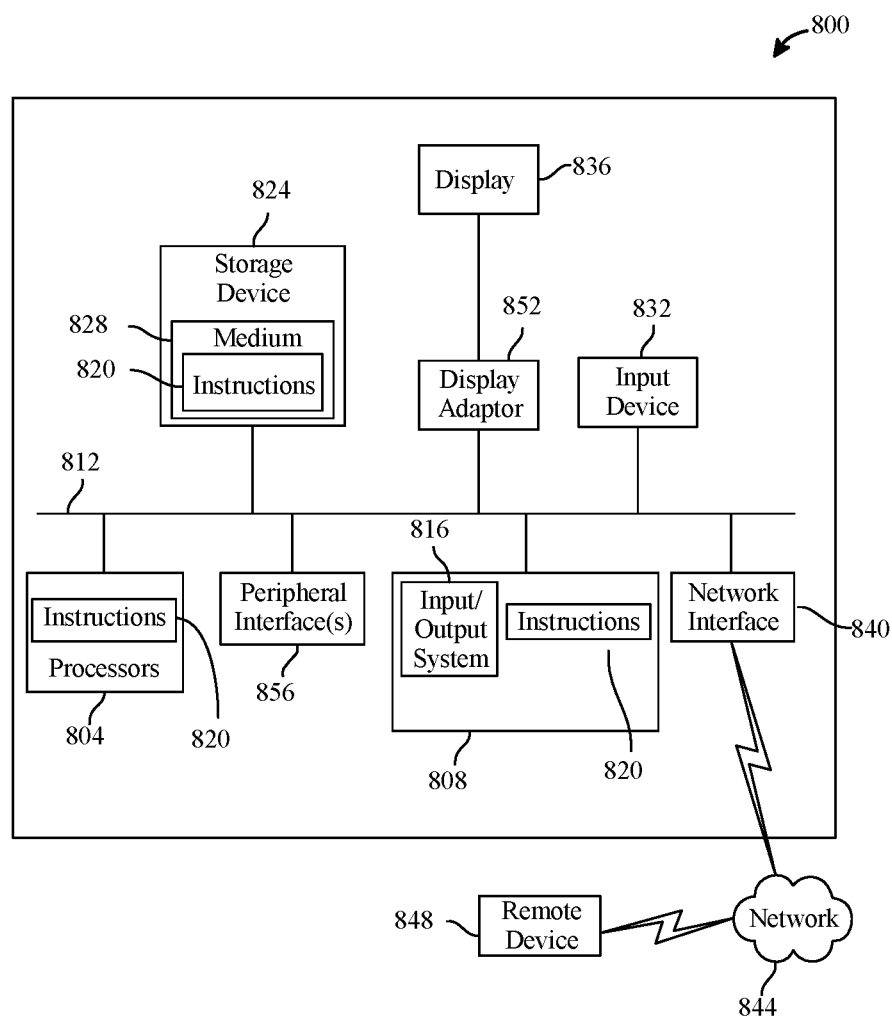
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for proportional calculation regarding non-fungible tokens, the apparatus comprising:
    at least a processor; and
    a memory communicatively connected to the at least a processor, the memory containing instructions configuring the at least a processor to:
        receive a plurality of non-fungible tokens, the plurality of non-fungible tokens comprising:
            a primary non-fungible token representing a primary creative work; and
            a secondary non-fungible token representing a secondary work, wherein the secondary creative work comprises at least a portion of the primary creative work;
        calculate a contribution metric of primary creative work to the secondary creative work, wherein calculating the contribution metric comprises:
            training a contribution metric machine-learning model using a creative ratio training set, wherein the creative ratio training set comprises an element of creative overlap between the primary creative work and the secondary creative work correlated to an output metric; and
            outputting the contribution metric as a function of the contribution metric machine-learning model; and
        post a digitally signed assertion to an immutable sequential listing as a function of the contribution metric.

2. The apparatus of claim 1, wherein the digitally signed assertion further includes:
    a primary token entry representing the primary non-fungible token; and
    a secondary token entry representing the secondary non-fungible token, wherein the secondary token entry is linked to the primary token entry.

3. The apparatus of claim 2, wherein the secondary token entry is linked to the primary token entry as a function of a digitally assigned assertion.

4. The apparatus of claim 1, wherein the primary creative work is included in the secondary creative work using at least one intervening creative work, and the processor is further configured to generate the contribution metric as a function the at least an intervening creative work.

5. The apparatus of claim 4, wherein generating the contribution metric as a function of the at least an intervening creative work further comprises:
    generating a first intervening metric as a function of the at least an intervening creative work and the primary creative work;
    generating a second intervening metric as a function of the at least an intervening creative work and the secondary creative work; and generating the contribution metric as a function of the first intervening metric and the second intervening metric.

6. The apparatus of claim 4, wherein the at least an intervening metric is represented by at least an intervening non-fungible token.

7. The apparatus of claim 1, wherein the digitally signed assertion further comprises a conditional non-fungible token trigger.

8. The apparatus of claim 1, wherein the digitally signed assertion further comprises a quantitative requirement for a user associated with the secondary non-fungible token.

9. The apparatus of claim 8, wherein the quantitative requirement is determined as a function of a machine-learning process.

10. A method for proportional calculation regarding non-fungible tokens, the method comprising:
  receiving, by at least a processor communicatively connected to at least a memory, a plurality of non-fungible tokens, the plurality of non-fungible tokens comprising:
    a primary non-fungible token representing a primary creative work; and
    a secondary non-fungible token representing a secondary creative work, wherein the secondary work comprises at least a portion of the primary creative work;
  calculating a contribution metric of the primary creative work to the secondary creative work, wherein the method further comprises:
    training a contribution metric machine-learning model using a creative ratio training set, wherein the creative ratio training set comprises an element of creative overlap between the primary creative work and the secondary creative work correlated to an output metric; and
    outputting the contribution metric as a function of the contribution metric machine-learning model; and
  deploying a digitally signed assertion to an immutable sequential listing as a function of the contribution metric.

11. The method of claim 10, wherein the digitally signed assertion further includes:
  a primary token entry representing the primary non-fungible token; and
  a secondary token entry representing the secondary non-fungible token, wherein the secondary token entry is linked to the primary token entry.

12. The method of claim 11, wherein the secondary token entry is linked to the primary token entry as a function of a digitally assigned assertion.

13. The method of claim 10, wherein the primary creative work is included in the secondary creative work using at least one intervening creative work, and the processor is further configured to generate the contribution metric as a function the at least an intervening creative work.

14. The method of claim 13, wherein generating the contribution metric as a function of the at least an intervening creative work further comprises:
  generating, by the processor, a first intervening metric as a function of the at least an intervening creative work and the primary creative work;
  generating a second intervening metric as a function of the at least an intervening creative work and the secondary creative work; and
  generating the contribution metric as a function of the first intervening metric and the second intervening metric.

15. The method of claim 13, wherein the at least an intervening metric is represented by at least an intervening non-fungible token.

16. The method of claim 10, wherein the digitally signed assertion further comprises a conditional non-fungible token trigger.

17. The method of claim 10, wherein the digitally signed assertion further comprises a quantitative requirement for a user associated with the secondary non-fungible token.

18. The method of claim 17, wherein the quantitative requirement is determined as a function of a machine-learning process.

* * * * *